United States Patent
Mastronardi et al.

(10) Patent No.: US 9,536,257 B2
(45) Date of Patent: *Jan. 3, 2017

(54) DEVICE AND PROCESS FOR REMOTE MANAGEMENT OF A NETWORK OF AUDIOVISUAL INFORMATION REPRODUCTION SYSTEMS

(71) Applicant: TouchTunes Music Corporation, New York, NY (US)

(72) Inventors: Tony Mastronardi, Pierrefonds (CA); Guy Nathan, Nun's Island (CA); Hugues Clement, Montreal (CA)

(73) Assignee: TouchTunes Music Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,138

(22) Filed: Aug. 27, 2015

(65) Prior Publication Data
US 2015/0371296 A1 Dec. 24, 2015

Related U.S. Application Data

(63) Continuation of application No. 14/171,213, filed on Feb. 3, 2014, now Pat. No. 9,152,633, which is a (Continued)

(30) Foreign Application Priority Data

May 10, 2000 (FR) ...................................... 00 05938

(51) Int. Cl.
G06F 17/30 (2006.01)
G06Q 30/06 (2012.01)
(Continued)

(52) U.S. Cl.
CPC ..... *G06Q 30/0601* (2013.01); *G06F 17/30017* (2013.01); *G06F 17/3074* (2013.01); (Continued)

(58) Field of Classification Search
USPC ....... 707/688, 694, 695, 758, 791, 796, 802, 707/803, 804, 806, 807
See application file for complete search history.

(56) References Cited

U.S. PATENT DOCUMENTS

| | | | |
|---|---|---|---|
| 3,807,541 | A | 4/1974 | Kortenhaus |
| 3,982,620 | A | 9/1976 | Kotenhaus |

(Continued)

FOREIGN PATENT DOCUMENTS

| | | |
|---|---|---|
| AU | 199954012 | 4/2000 |
| CN | 1340939 | 3/2002 |

(Continued)

OTHER PUBLICATIONS

"About Ecast" leaflet, 2 pages, at least as early as Nov. 8, 2013.
(Continued)

*Primary Examiner* — Cam-Linh Nguyen
(74) *Attorney, Agent, or Firm* — Nixon & Vanderhye, P.C.

(57) ABSTRACT

Management device for a network of audiovisual information reproduction systems or jukeboxes, including a database with a plurality of sets of arrays, each array containing grouped information either about the composition of a jukebox, or the use of the jukebox, or the payment of fees. The database is managed by a computer server connected with the audiovisual information reproduction systems to receive messages sent by each audiovisual information reproduction device and containing information necessary to update determined sets of arrays in the database, and update data or the program for each audiovisual information repro-
(Continued)

duction device with information stored in at least one set of arrays in the database and transmitted in this message.

20 Claims, 23 Drawing Sheets

Related U.S. Application Data continuation of application No. 13/593,831, filed on Aug. 24, 2012, now Pat. No. 8,655,922, which is a continuation of application No. 13/179,834, filed on Jul. 11, 2011, now Pat. No. 8,275,807, which is a continuation of application No. 12/230,254, filed on Aug. 26, 2008, now Pat. No. 7,996,438, which is a continuation of application No. 10/419,787, filed on Apr. 22, 2003, now Pat. No. 7,512,632, which is a continuation of application No. 09/598,170, filed on Jun. 21, 2000, now Pat. No. 6,578,051.

(51) Int. Cl.
*G06Q 20/38* (2012.01)
*G07F 17/30* (2006.01)
*G10H 1/00* (2006.01)
*H04N 7/16* (2011.01)
*H04N 7/173* (2011.01)
*H04N 21/2543* (2011.01)
*H04N 21/258* (2011.01)
*H04N 21/45* (2011.01)
*H04N 21/458* (2011.01)
*H04N 21/61* (2011.01)
*H04N 21/8352* (2011.01)

(52) U.S. Cl.
CPC ......... *G06Q 20/382* (2013.01); *G07F 17/305* (2013.01); *G10H 1/0058* (2013.01); *H04N 7/164* (2013.01); *H04N 7/165* (2013.01); *H04N 7/173* (2013.01); *H04N 21/2543* (2013.01); *H04N 21/25816* (2013.01); *H04N 21/4532* (2013.01); *H04N 21/4586* (2013.01); *H04N 21/6137* (2013.01); *H04N 21/8352* (2013.01); *G10H 2240/125* (2013.01); *G10H 2240/181* (2013.01); *G10H 2240/241* (2013.01); *Y10S 707/99931* (2013.01); *Y10S 707/99933* (2013.01); *Y10S 707/99945* (2013.01); *Y10S 707/99948* (2013.01)

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Hori et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |

(56) References Cited

U.S. PATENT DOCUMENTS

| | | |
|---|---|---|
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | San Soucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whisler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankovitz |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choquier |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |

(56) References Cited

U.S. PATENT DOCUMENTS

| | | |
|---|---|---|
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Bleidt et al. |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Owens et al. |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |

(56) References Cited

U.S. PATENT DOCUMENTS

| | | |
|---|---|---|
| 6,359,616 B1 | 3/2002 | Ogura et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Pehkonen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,533,182 B2 | 5/2009 | Wurtzel et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,987,282 B2 | 7/2011 | Nathan et al. |
| D642,553 S | 8/2011 | Nathan et al. |
| 7,992,178 B1 | 8/2011 | Nathan et al. |
| 7,996,438 B2 | 8/2011 | Mastronardi et al. |
| 7,996,873 B1 | 8/2011 | Nathan et al. |
| 8,015,200 B2 | 9/2011 | Seiflein et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,074,253 B1 | 12/2011 | Nathan |
| 8,103,589 B2 | 1/2012 | Nathan et al. |
| 8,127,324 B2 | 2/2012 | Nathan |
| 8,151,304 B2 | 4/2012 | Nathan et al. |
| 8,165,318 B2 | 4/2012 | Nathan et al. |
| 8,184,508 B2 | 5/2012 | Nathan et al. |
| 8,189,819 B2 | 5/2012 | Nathan et al. |
| 8,214,874 B2 | 7/2012 | Nathan |
| 8,225,369 B2 | 7/2012 | Nathan et al. |
| D665,375 S | 8/2012 | Garneau et al. |
| 8,292,712 B2 | 10/2012 | Nathan et al. |
| 8,332,887 B2 | 12/2012 | Dion et al. |
| 8,332,895 B2 | 12/2012 | Nathan et al. |
| 8,428,273 B2 | 4/2013 | Nathan |
| 8,429,530 B2 | 4/2013 | Neuman et al. |
| 8,661,477 B2 | 2/2014 | Nathan et al. |
| 8,726,330 B2 | 5/2014 | Nathan et al. |
| 8,849,435 B2 | 9/2014 | Dion et al. |
| 9,171,419 B2 | 10/2015 | Dion et al. |
| 9,330,529 B2 | 5/2016 | Fedesna et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |

(56) References Cited

U.S. PATENT DOCUMENTS

| | | |
|---|---|---|
| 2002/0002483 A1 | 1/2002 | Siegel et al. |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Lok et al. |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0293773 A1 | 12/2006 | Nathan et al. |
| 2007/0025701 A1 | 2/2007 | Kawasaki et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0247979 A1 | 10/2007 | Brillon et al. |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0305738 A1 | 12/2008 | Khedouri et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0138111 A1 | 5/2009 | Mastronardi |
| 2009/0172565 A1 | 7/2009 | Jackson et al. |
| 2009/0177301 A1 | 7/2009 | Hayes |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0307314 A1 | 12/2009 | Smith et al. |
| 2010/0042505 A1 | 2/2010 | Straus |
| 2010/0211818 A1 | 8/2010 | Nathan et al. |
| 2010/0241259 A1 | 9/2010 | Nathan |
| 2010/0247081 A1 | 9/2010 | Pons |
| 2010/0269066 A1 | 10/2010 | Nathan |
| 2010/0299232 A1 | 11/2010 | Nathan et al. |
| 2011/0066943 A1 | 3/2011 | Brillon et al. |
| 2011/0283236 A1 | 11/2011 | Beaumier et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |
| 2014/0149229 A1 | 5/2014 | Mastronardi et al. |

FOREIGN PATENT DOCUMENTS

| | | |
|---|---|---|
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |

(56) References Cited

FOREIGN PATENT DOCUMENTS

| | | |
|---|---|---|
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 07-311587 | 11/1995 |
| JP | 8274812 | 10/1996 |
| JP | 08279235 | 10/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2005-107267 | 4/2005 |
| JP | 2005-184237 | 7/2005 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-241748 | 9/2007 |
| JP | 2008-058656 | 3/2008 |
| JP | 2009-017529 | 1/2009 |
| JP | 2009-075540 | 4/2009 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 93/21732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 01/84353 | 11/2001 |
| WO | WO 02/060546 | 8/2002 |
| WO | WO 02/095752 | 11/2002 |
| WO | WO 03/069613 | 8/2003 |
| WO | WO 2004/029775 | 4/2004 |
| WO | 2005/026916 | 3/2005 |
| WO | WO 2006/014739 | 2/2006 |
| WO | WO 2006/056933 | 6/2006 |
| WO | WO 2007/092542 | 8/2007 |
| WO | WO 2008-033853 | 3/2008 |
| WO | WO 2011094330 | 8/2011 |
| WO | WO 2013/040603 | 3/2013 |

OTHER PUBLICATIONS

Ahanger et al.; A Digital On-Demand Video Service Supporting Content-Based Queries; 1993; 9 pages.

Austin Cyber Limits: Name That Tune [online], [retrieved Jul. 23, 2001]. Retrieved from the Internet: <http://www.pbs.ork/klru/austin/games/namethattune.html>.

Back to the Tunes [online], [retrieved Jul. 23, 2001]. Retrieved from the Internet: <http://citc5.hispeed.com/rules.html>.

Bonczek et al, "The DSS Development System", 1983 National Computer Conference, Anaheim, California, May 16-19, 1983, pp. 441-455.

Chan et al., "Distributed servers architectures for networked video services", IEEE Trans on Networking, vol. 9, No. 2, pp. 125-136, 2001.

Chen et al., "Optimization of the grouped sweeping scheduling (GSS) with heterogeneous multimedia streams", ACM Multimedia, pp. 1-7, 1993.

Crutcher et al., "The networked video Jukebox", IEEE, Trans. on circuits and systems for video technology, vol. 4, No. 2, pp. 105-120, 1994.

"Darts Revolution Again", Replay Magazine, Mar. 1991, pp. 146-148.

Decision of the European Patent Office to revoke the related EP Patent No. 786 125, Feb. 17, 2005.

Derfler et al., "How Networks Work", Millennium Ed., Que Corporation, Jan. 2000.

Drews, C.; Pestoni, F.; "Virtual jukebox: reviving a classic," Proceedings of the 35th Annual Hawaii International Conference System Sciences, pp. 887-893, Jan. 7-10, 2002.

"Ecast Forges Landmark International Technology Partnership", Business Wire at www.findarticles.com/cf_0/m0EIN/2000_July_25/63663604/print.html, 2 pages, Jul. 25, 2000.

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

European Search Report issued in EP 1 993 079, Jan. 15, 2009.

European Search Report issued for European Application No. 08000845.1-1238/1962251, dated Apr. 3, 2009.

Fachbuch, "Unterhaltungselektronic von A-Z" gfu 1, VDE-Verlag GmbH, pp. 12-13, 1983-1984.

"Foobar 2000 Evaluation Updated," MonkeyBiz, Aug. 3, 2008, 4 pages (with partial English translation) http://monkeybizinfo.blogspot.jp/2008/08/foobar2000.html.

(56) References Cited

OTHER PUBLICATIONS

Gallardo et al., "Tangible Jukebox: back to palpable music", ACM TEI, pp. 199-202, 2010.
Gralla, "How the Internet Works", Millennium Ed., Que Corporation, Aug. 1999.
Galen A. Grimes, Chapter 18, "Taking Advantage of Web-based Audio" [online] [retrieved Mar. 24, 2000].
Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
iTouch 8 Plus brochure, JVL Corporation, 2005, 2 pages.
iTOUCH 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Petril Koskelainem, "Report on Streamworks™," [online] [retrieved Mar. 24, 2000].
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Definition of "Dynamically," Merriam Webster's Collegiate Dictionary, Tenth Edition, Merriam-Webster, Inc., Copyright 1999, pp. 361.
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), Oct. 27 1 JP 07 281682, figure 1-6 abrége.
Peter Pawlowski, "Basic Player Whose Appearance and Functions can be Customized Freely 'Foobar 2000'v1.0 is Unveiled,"Windows Forest, Japan, Jan. 12, 2010, 3 pages (with partial English translation). http://forest.impress.co.jp/docs/news/20100112 341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
W. Richard Stevens, "TCP/IP Illustrated: vol. 1, the Protocols," Copyright 1994.
Stewart, "Ecast Deploys Marimba's Castanet to Power an Internet-Based, Entertainment Management System For the Out-of-Home Market", Marimba, Press Release, 3 pages, www.marimba.com/news/releases/ecast.dec13.html, Dec. 13, 1999.
Strauss et al., "Information Jukebox a semi public device for presenting multimedia information content", Pers. Ubiquit Comput, 7, pp. 217-220, 2003.
Summary of the oral proceedings regarding EP 786 125 before the Opposition Division of the European Patent Office, Feb. 17, 2005.
Tom & Liz's Name That Tune [online], [retrieved Jul. 23, 2001]. Retrieved from the Internet: <http://home.att.net/~tomnliz/Music.html>.
U.S. Appl. No. 29/371,355, Garneau et al., filed Dec. 14, 2010.
U.S. Appl. No. 61/536,015, filed Sep. 18, 2011; Rivera et al.
U.S. Appl. No. 29/401,854, filed Sep. 16, 2011; Garneau et al.
U.S. Appl. No. 61/129,637, Dion, filed Jul. 9, 2008.
U.S. Appl. No. 61/202,617, Dion, filed Mar. 18, 2009.
U.S. Appl. No. 61/584,750, filed Jan. 9, 2012; Rivera et al.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kankyo Settei' Catalog & Tips 10 Sen, Mac People, ASCII Corporation, Oct. 1, 2007.
Written Opinion issued in PCT/US1122598, mailed Mar. 29, 2011.

DEVICE AND PROCESS FOR REMOTE MANAGEMENT OF A NETWORK OF AUDIOVISUAL INFORMATION REPRODUCTION SYSTEMS

CROSS REFERENCE TO RELATED APPLICATIONS

This application is a continuation of application Ser. No. 14/171,213 filed Feb. 3, 2014, which is a continuation of application Ser. No. 13/593,831 filed Aug. 24, 2012, which is a continuation of application Ser. No. 13/179,834 filed Jul. 11, 2011, which is a continuation of application Ser. No. 12/230,254 filed Aug. 26, 2008, which is a continuation of application Ser. No. 10/419,787 filed Apr. 22, 2003, which is a continuation of application Ser. No. 09/598,170 filed Jun. 21, 2000, which claims priority to French Application No. 0005938 filed May 10, 2000, the entire contents of each of which are hereby incorporated by reference in this application.

FIELD OF THE INVENTION

This invention relates to a device and a process for the management of a network of audiovisual information reproduction systems.

BACKGROUND OF THE INVENTION

International patent application WO 96/12255 describes a device for reproduction of audiovisual information commonly called jukebox. This jukebox is organized around a system unit that manages audiovisual reproduction means and means for memorizing at least one audiovisual information corresponding at least to the sound reproduction of one song. The system unit also manages telecommunication means such as a modem, particularly to enable downloading of audiovisual information from a host server. Management of orders for new songs and for changing settings requires either that an operator should visit the site on which the jukebox is installed, or that the operator should use a computer with a link to the host server. Furthermore, management operations that can be performed through the link with the host server are limited to ordering new musical selections.

OBJECT AND SUMMARY OF THE INVENTION

Therefore, the purpose of this invention is to overcome the disadvantages of prior art by proposing a device for management of audiovisual information reproduction systems that can be used to manage all information related to audiovisual information reproduction systems and their operation in a simple and centralized manner.

This purpose is achieved by the fact that the device for management of a network of audiovisual information reproduction systems is characterized in that it comprises a database with a plurality of sets of arrays, each array containing grouped information either about the composition of a jukebox, or the use of the jukebox, or the payment of fees, the database is managed by a computer server provided with means of connection with audiovisual information reproduction systems to firstly receive messages sent by each audiovisual information reproduction device and containing information necessary to update determined sets of arrays in the database, and secondly to send messages to each audiovisual information reproduction device in order to update data or the program for each audiovisual information reproduction device with information stored in at least one set of arrays in the database and transmitted in this message.

According to another feature, a first set of arrays comprises general information about the operating status of the jukebox.

According to another feature, the first set of arrays comprises a number uniquely identifying each jukebox, the operating status of the jukebox, the password authorizing operation of the jukebox and the jukebox installation date.

According to another feature, a second set of arrays in the database comprises information about the hardware and software composition of each jukebox.

According to another feature, the second set of arrays comprises a group of tables containing all software that can be used on the jukeboxes, each program being identified by at least its name and its version number.

According to another feature, the second set of arrays comprises a group of tables containing the program names and versions installed on each jukebox, for each given jukebox.

According to another feature, the second set of arrays comprises a group of tables containing the list of hardware components usable in each jukebox, each component being identified by a number, the group of tables also comprising an argument corresponding to the number of the jukebox on which the component is installed.

According to another feature, the second set of arrays comprises a group of tables containing the descriptions of each software and/or a group of tables listing incompatibilities between the software and/or a group of tables containing descriptions of each hardware component, and/or a group of tables listing incompatibilities between components and software, and/or a group of tables containing the list of software associated with hardware components.

According to another feature, a third set of arrays comprising a first subset contains all possible values for the different operating and setting parameter sets for all jukeboxes, each value for a parameter set being identified by a unique number.

According to another feature, a second subset of the third set of arrays associates an identifier of the operating and setting parameter set contained in a group of tables in the first subset of the first group, for each jukebox identifier.

According to another feature, the parameter sets contain the different possible passwords in a first group of tables and/or the prices of songs in a second group of tables and/or the setting of a remote control of a jukebox in a third group of tables and/or the number of free songs usable in a third group of tables and/or Internet connection elements in a fourth group of tables.

According to another feature, a fourth set of tables determines the list of song numbers available on a jukebox with a given identifier number.

According to another feature, a fifth set of arrays comprises a description of all songs, artists and albums making up a bank of songs in the database, each song being identified by a number.

According to another feature, the fifth set of arrays comprises a group of tables containing a description of each song in the songs bank and whether or not it is available on each jukebox, a group of tables containing a description of each album in the songs bank and whether or not it is available on each jukebox, and a group of tables containing a description of each artist or group of artists in the songs bank.

According to another feature, a sixth set of arrays comprises information about the placement of a filter on each jukebox to prevent downloading of at least one song chosen by an operator.

According to another feature, the sixth set of arrays comprises a plurality of groups of tables that define all criteria for all filters that may be setup on each jukebox and applicable to at least one determined artist and/or at least one determined songs category and/or at least one determined disk publisher and/or at least one determined song, each filter being described in an array and identified by a unique number identifying the filter.

According to another feature, the first set of arrays comprises an argument corresponding to the identifier of the filter(s) applied to the determined jukebox.

According to another feature, a seventh set of arrays comprise information about operators that own or rent each jukebox.

According to another feature, an eighth set of arrays comprises the history of the use of each jukebox.

According to another feature, the eighth set of arrays comprises a group of tables containing the list of all identifiers of songs distributed on each audiovisual information reproduction device, this array being updated by the server on reception of a report file, by a determined audiovisual information reproduction device, and containing the list of songs distributed on the jukebox.

According to another feature, a ninth set of arrays comprises information necessary for the calculation of fees and the rental cost for each jukebox.

According to another feature, a tenth set of arrays comprises all instructions intended to update at least one audiovisual information reproduction device, these instructions being transmitted to the audiovisual information reproduction device concerned by the server as soon as the audiovisual information reproduction device sets up a communication with the server.

According to another feature, the tenth set of arrays comprises a group of tables identifying update instructions for a determined jukebox and the order in which the instructions must be executed on the jukebox and/or the date starting from which the server can transmit instructions to the jukebox.

According to another feature, the instructions contained in the eleventh set of tables are memorized before the date starting from which the server can transmit instructions to the jukebox.

According to another feature, the tenth set of arrays comprises a plurality of groups of tables containing update instructions possible on each jukebox, each instruction related either to an update to the software, or the addition of a new album, or the addition of a new song, or the management of computer files on a jukebox, or the modification of a jukebox operating parameter.

According to another feature, the tenth set of arrays comprises a group of specific tables comprising all identifiers of instructions that were correctly transmitted to each jukebox, the group of specific tables also comprises at least the destination jukebox identifier and the instruction transmission date, for each instruction identifier.

According to another feature, the tenth set of arrays comprises at least one group of specific tables defining events triggering a given instructions group.

According to another feature, a first subset of an eleventh set of arrays comprises information about setting up a promotion for the distribution of at least one song available on each jukebox, each promotion being identified by a number, and in that a second subset of the eleventh set of arrays comprises references of the promotion(s) applicable to a given jukebox.

According to another feature, the first subset of the eleventh set of arrays comprises at least one group of specific tables defining all songs for which there is a promotion, and the promotion start and end dates, and the first subset of the eleventh set of arrays also comprises a group or specific tables comprising price modifications of the songs for which the promotion is made.

According to another feature, payment of fees due for the distribution of all songs included in the promotion is charged to the promoter who initiated the promotion.

According to another feature, the server comprises a module for the display of information in the database in order to display at least one screen comprising at least one information display area and/or at least one information input area and/or at least one information selection area, each selection area provokes the collection of information by the server in the database or validation of information contained in each input area and each display area includes the value of an argument in the database.

A second purpose of the invention is to propose a process for the management of a network of audiovisual information reproduction systems or jukebox.

This second purpose is achieved by the fact that the process for the management of a network of audiovisual information reproduction systems or jukebox comprises a computer server with means of connection to information reproduction systems, characterized in that it comprises:

a step in which a jukebox is connected to the server to setup a communication, a step with transfers of at least one message from the jukebox to the server, a step in which the server processes the message to identify the jukebox that setup a communication and to update at least one table in a database controlling central management of the jukeboxes, a step to search for instructions to update the jukebox, in at least one group of tables in the database, a step for the construction of a message and then transfer of the message from the server containing the update instructions found in the database, to the jukebox that setup the communication.

BRIEF DESCRIPTION OF THE DRAWINGS

Other features and advantages of this invention will become more obvious after reading the following description with reference to the attached drawings in which:

FIG. 1 is a

DESCRIPTION OF THE PREFERRED EMBODIMENTS

Before describing details of the remote management system for an audiovisual reproduction device according to the invention, it is worth mentioning the composition of an audiovisual reproduction device and its operating mode.

Figure 4:
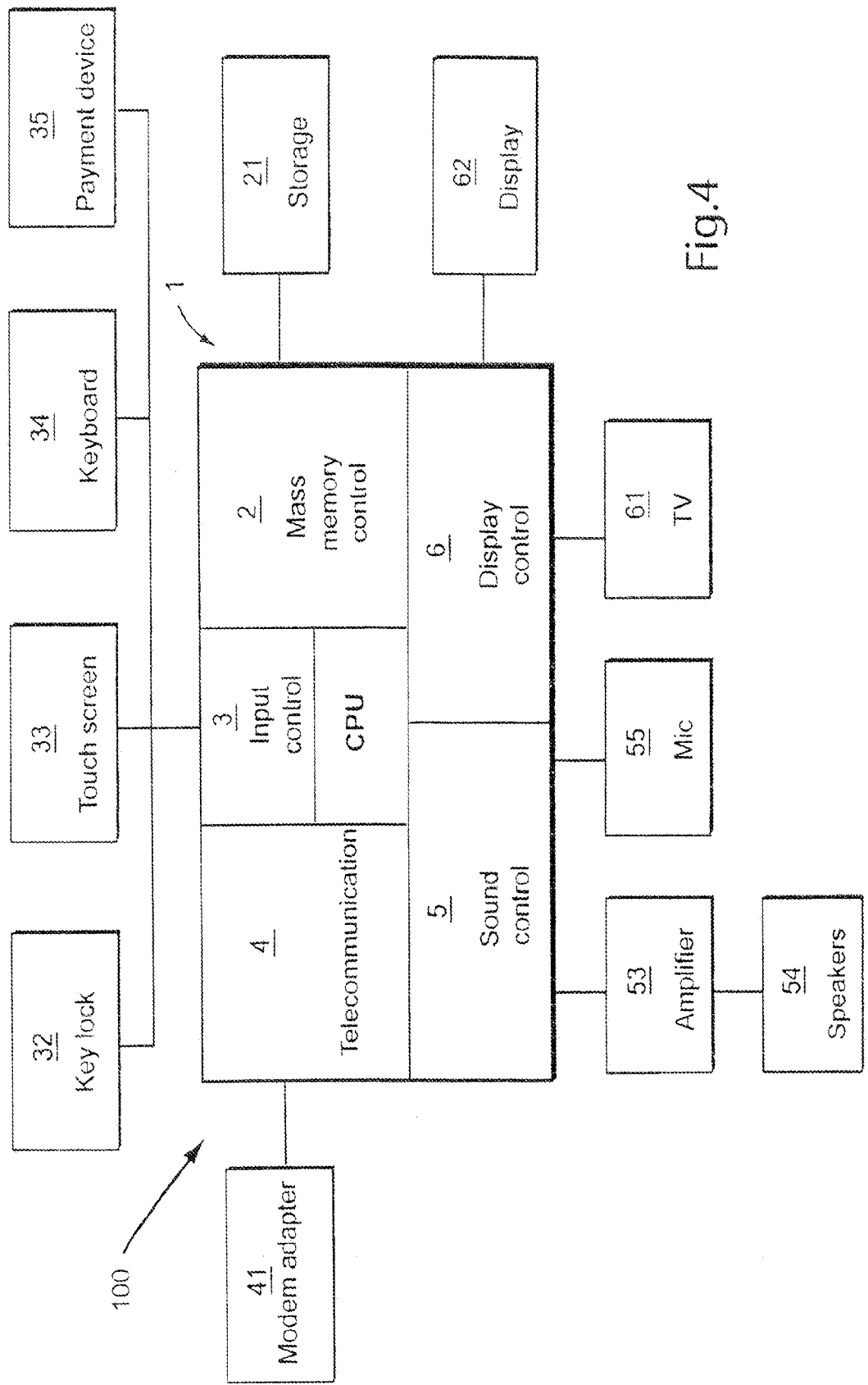
FIG. 4 shows an example of an audiovisual reproduction device.

FIG. 4 shows an example of an audiovisual information reproduction device. This type of device is described in particular in international patent application WO 96/12255 submitted by the applicant. Preferably, but in no way restrictively, this audiovisual information reproduction device uses the hardware components mentioned and referenced below.

The system unit 1 with a microprocessor is a high performance PC compatible system, the choice at the time of implementation was made for an Intel Pentium type system with at least the following memory means and characteristics:

compatibility with the Vesa local bus, processor cache memory: 256 kbytes,

RAM memory: 32 Mbytes, high performance serial and parallel ports, microprocessor controlled SVGA type graphic adapter, SCSI/2 type bus controller, self-powered static RAM memory.

Any other system unit with equivalent or better performances could be used in the invention.

This system unit controls and manages a sound control circuit 5, a telecommunications control circuit 4, an input control circuit 3, a mass memory control circuit 2, and a display means 62 control circuit 6. The display means are composed primarily of a SVGA type flat screen, high resolution, low radiation video monitor 62 with no interlacing. This is the monitor that will be used for image reproduction (for example album covers for musical selections), and to display graphics and video clips.

Storage modules 21 using high speed, high capacity SCSI type hard disks form part of the memory means and are associated with the memory means already existing in the microprocessor device. These modules are used for the storage of audiovisual information.

A 28.8 kbps high speed telecommunications modem adapter 41 is included to create the link with an audiovisual information distribution network controlled by a host server.

For the reproduction of audio information in musical selections, the system comprises loudspeakers 54 into which the signal from an amplifier tuner 53 connected to a music synthesizer type electronic circuit 5 is input, designed to accept a large number of input sources while providing a CD (compact disk) type quality output, for example such as the microprocessor multimedia audio adapter such as a sound card.

The audiovisual reproduction device is provided with an input controller circuit 3 that manages a touch screen 33 including a glass coating panel using the "advanced surface wave technology", and an AT type bus controller. This touch screen placed in front of the monitor can be used to select various selection information used by customers, and ordering and management control information used by the system manager or owner, on the video monitor display 62 or on a television screen 61. It is also used with an external keyboard 34 that can be connected to the system that is provided with a keyboard connector for this purpose, controlled by a key lock 32 through the interface circuit 3, for maintenance purposes.

A fee payment device 35 is also connected to the input interface circuit 3. Any other device can be used that enables reception of any payment method by coins, tickets, tokens, magnetic cards or smart cards or a combination of payment means.

The system is installed in a steel frame or rack.

Apart from these elements, a cordless microphone 55 is connected to the audio controller 5, to transform the audio controller into a powerful public address and public information system, and possibly a karaoke machine. The system can use a system of cordless loudspeakers.

The audiovisual information reproduction device also comprises an integrated circuit (not shown), electrically powered only when a read or write operation is carried out, and capable of storing the serial number in a nonvolatile memory. The operating system can read or write information on the circuit through a control circuit, particularly to keep the jukebox serial number and the different operating parameters. This circuit is called an "Ibutton" in prior art.

The operating software in the system was generated around a library of tools and services specifically designed for the audiovisual field in a multimedia universe. This library advantageously includes a high performance multi-task operating system that efficiently enables simultaneous execution of multiple code fragments. This operating software enables concurrent and orderly execution, thus avoiding any conflict between operations carried out on display means, audio reproduction means and management of telecommunication links through the distribution network. Furthermore, this software is extremely flexible.

Throughout the rest of this description, the terms "audiovisual information reproduction device" and "jukebox" refer to the same object.

Figure 1:
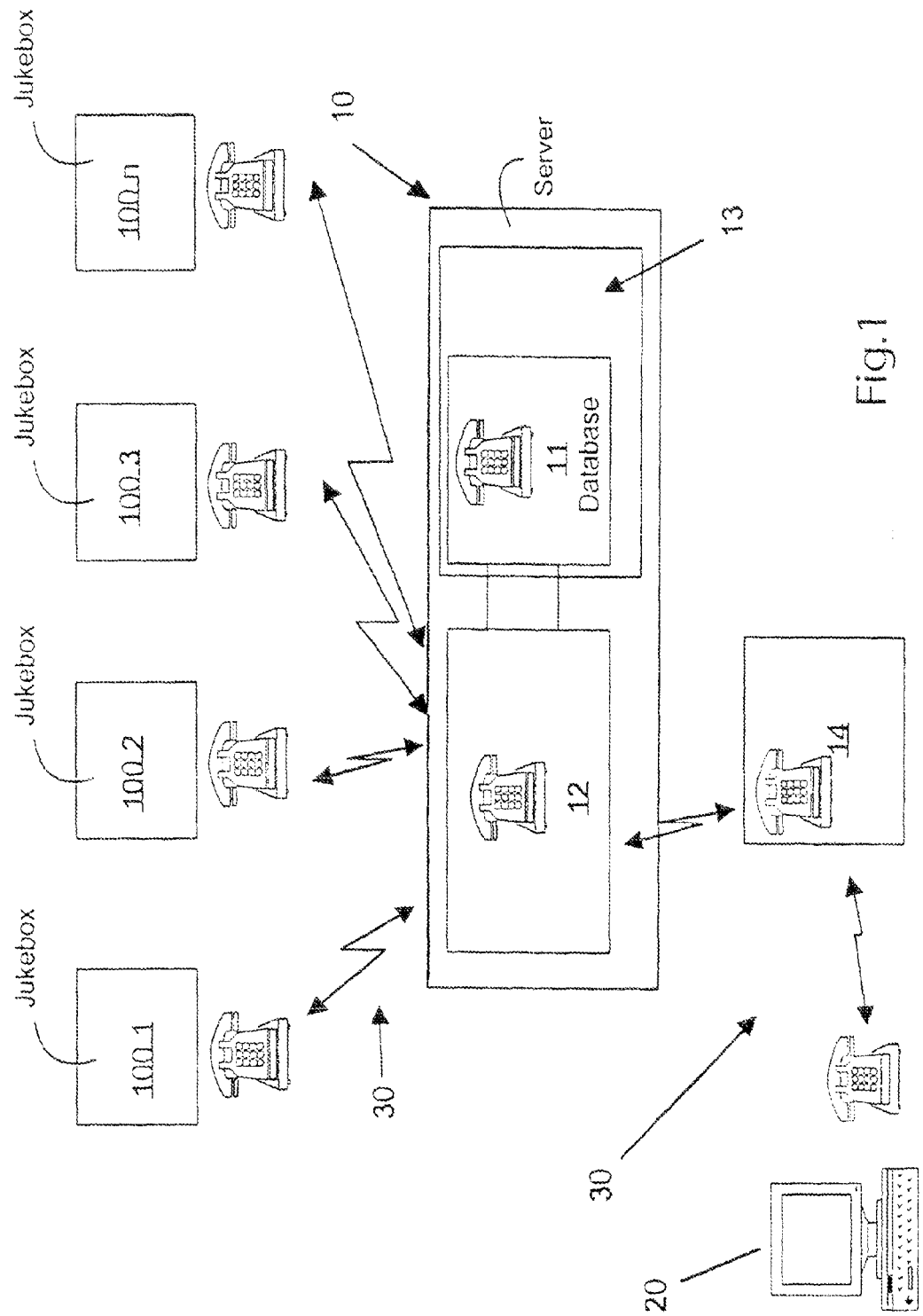
FIG. 1 shows a block diagram of a system using a server according to the invention.
Figure 2:
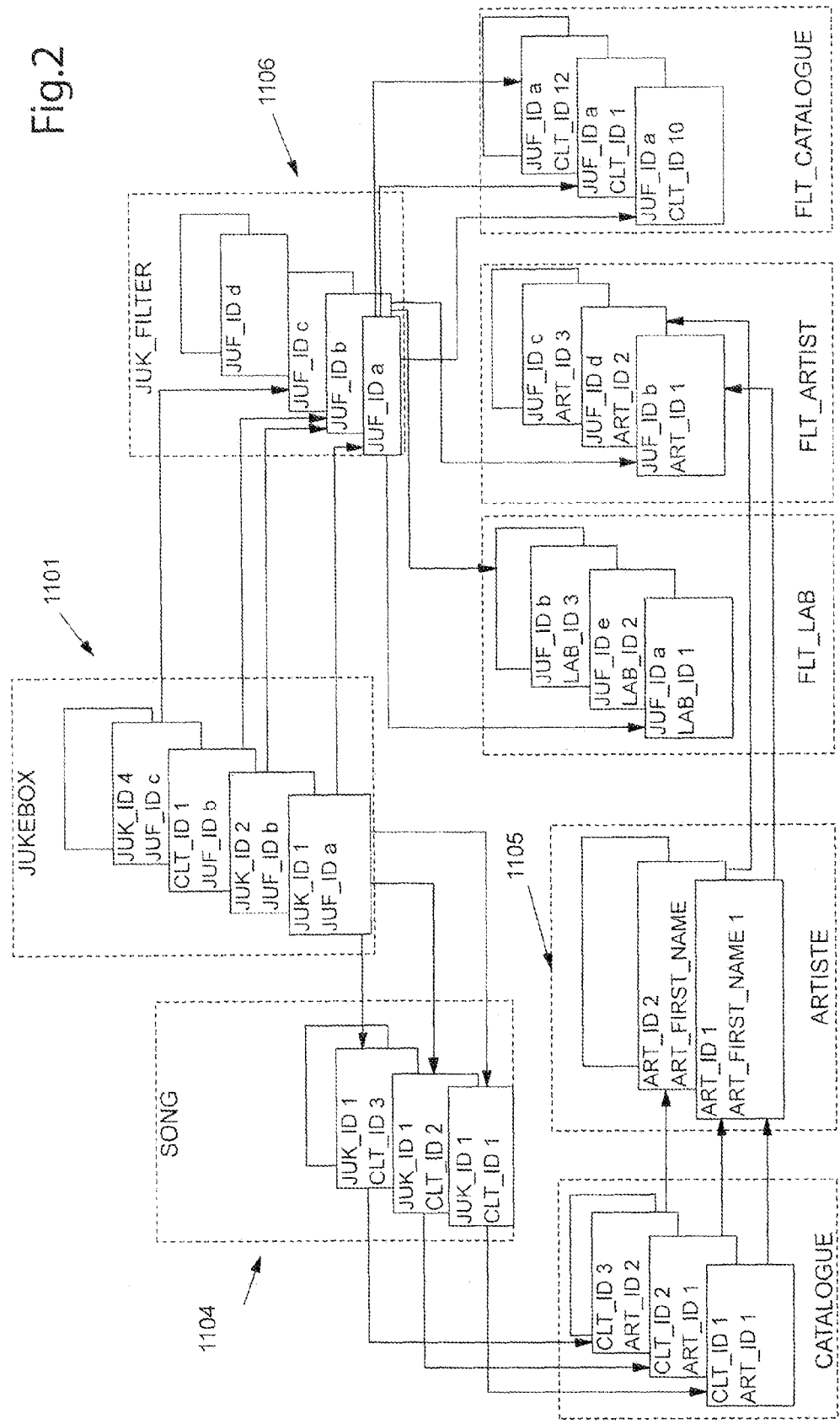
FIG. 2 shows a simplified flow chart of the structure of a database of the server used by the system according to the invention.

FIG. 1 shows a block diagram of the device according to the invention. According to prior art, each audiovisual reproduction device (100.1 to 100.*n*) communicates with the host server 10 through its telecommunication means, and for example a modem card 41 connected to the telephone network 30. The host server 10 comprises communication means 121, 111 for this purpose, for example such as at least one modem connected to the telephone network. The host server 10 also comprises a database 11 containing all information about the operation of each audiovisual information reproduction device (100.1 to 100.*n*), in other words the operating parameters for the audiovisual information reproduction device (100.1 to 100.*n*), its identification number, the list of songs stored on each audiovisual information reproduction device (100.1 to 100.*n*), each operator being responsible for management of one group of audiovisual information reproduction device(s) (100.1 to 100.*n*). The database also contains statistics about the use of each audiovisual information reproduction device (100.1 to 100.*n*), in other words the list of songs played and the date on which each song was played, the list and date of all incidents that occurred during the use of each audiovisual information reproduction device (100.1 to 100.*n*), particularly when it was switched off, communication interruptions, and the number of times that payment means refused the money input or the proposed payment. Similarly, the database comprises the list of available songs stored in the host server memory means 10, the audiovisual information necessary for reproduction of these songs, and the setting tools necessary to install the operating system for each audiovisual information reproduction device (100.1 to 100.*n*). All the information contained in the database 11 is updated by means of communications, for example periodic communications, with each audiovisual information reproduction device (100.1 to 100.*n*) through the telephone network and modems for each audiovisual information reproduction device (100.1 to 100.*n*) and the database or the host server 10.

An example database 11 used in the device according to the invention will now be described with reference to FIGS. 2 and 3A to 3F. All this information in the database 11 is stored in the form of arrays. Each array contains information about a theme or structure or particular function of the audiovisual information reproduction systems (100.1 to 100.*n*, FIG. 1). Each item of information is identified by an argument contained in an array in the database 11. The information in one array may be linked to another array. This link is established when at least one argument is common to the two arrays.

Figures 1, 3A:
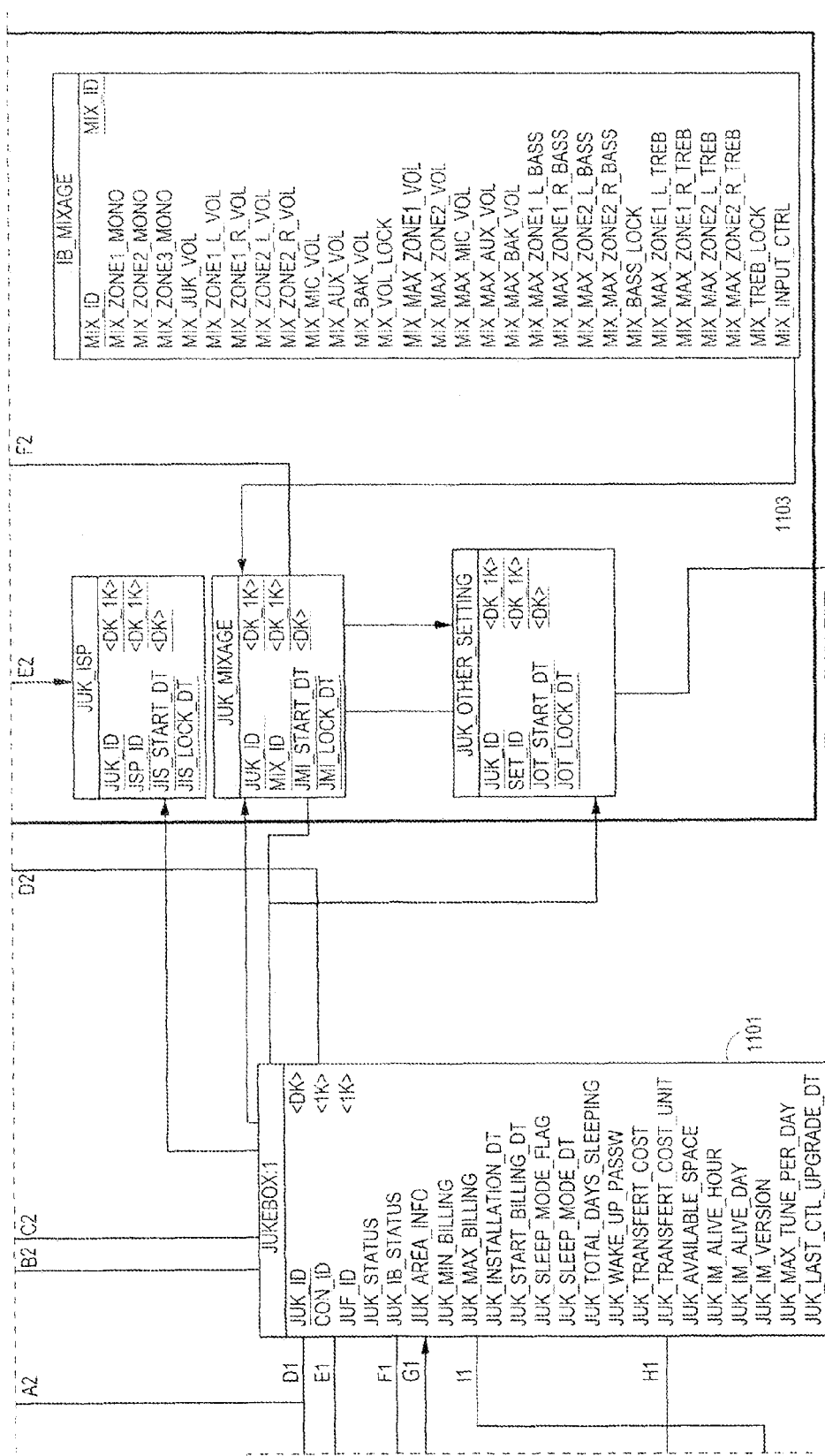
FIGS. 3A to 3F show a detailed flow chart of the structure of a database used by the system according to the invention.
Figures 2, 3A:
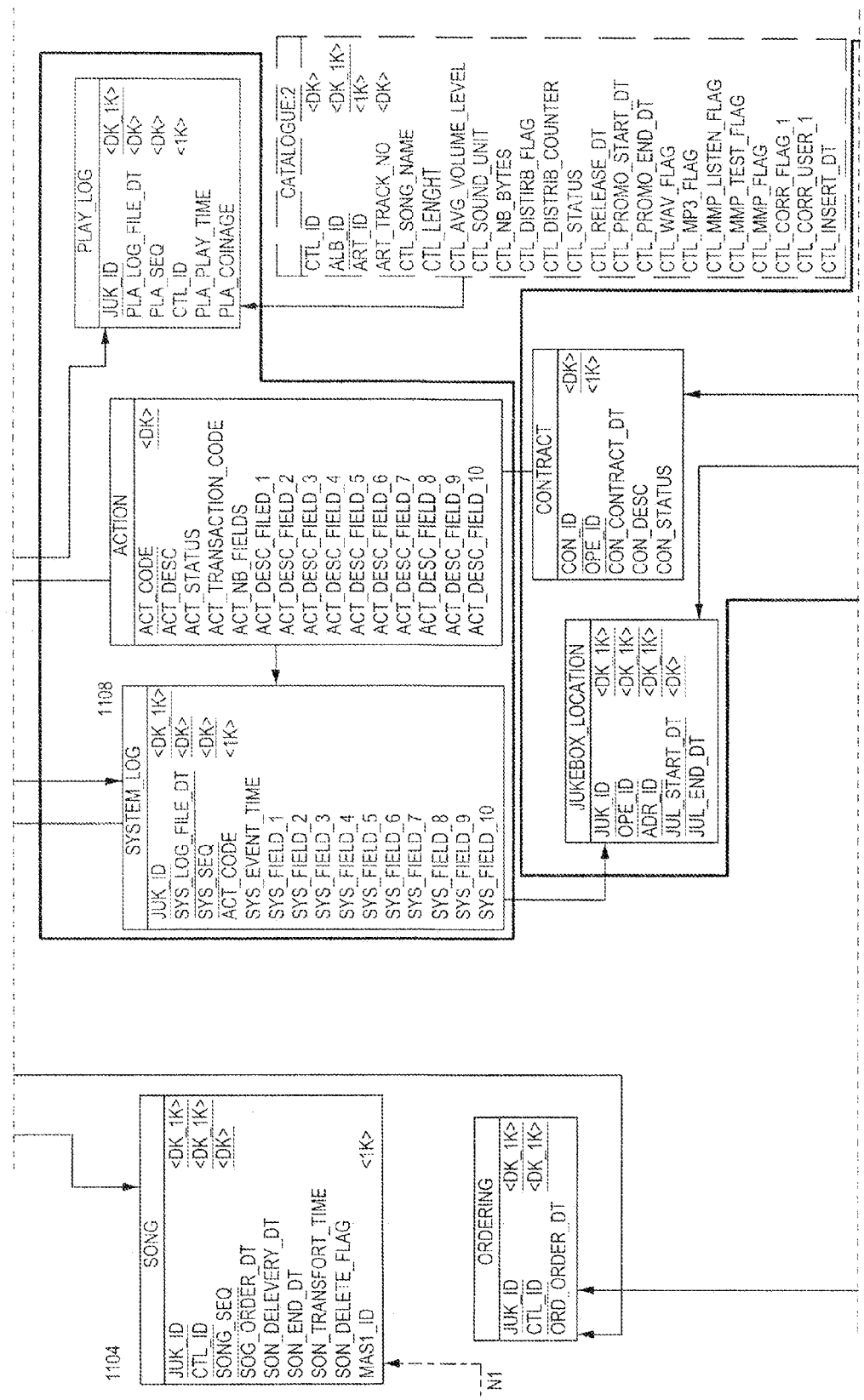
Figures 3, 3A:
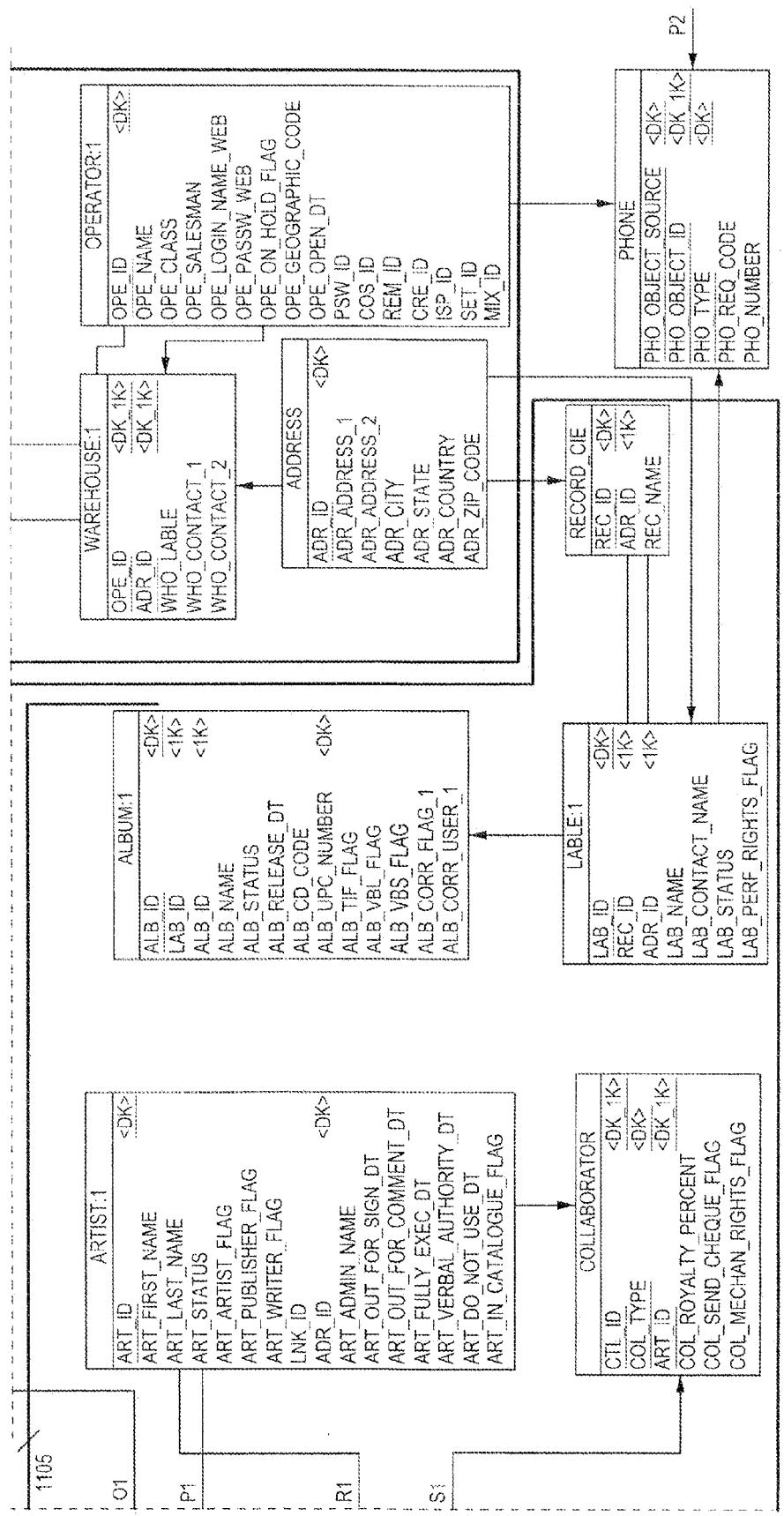

According to the invention, the database 11 comprises at least one first set of arrays (1101, JUKEBOX, FIGS. 2 and 3A and 3E) representing information directly concerning the audiovisual information reproduction device (100.1 to 100.*n*, FIG. 1), for example such as its operating status (JUK_STATUS, FIG. 3A), its identification number (JUK_ID, FIG. 3C), or the available memory space (JUK_AVAILABLE_SPACE, FIG. 3A). Each table in this first set of arrays 1101 represents a audiovisual information reproduction device (100.1 to 100.*n*, FIG. 1) identified in this table by its identification number (JUK_ID, FIG. 3A). Similarly, the information contained in the table in the first set of arrays (1101, FIG. 3A) can be updated when a message is received from a jukebox. This is done by the jukebox, as soon as it sets up communication with the server (10, FIG. 1) processing the received message to see if the information contained in the database needs to be updated. If the message contains information about changes to the jukebox status, the server modifies the argument of the table in the first set of arrays (1101, FIG. 3A) of the jukebox concerned by the received changes.

This first set of arrays (1101, FIG. 3A) is related to at least one second set of arrays (1102, SOFTWARE, FIRMWARE, COMPONENT, FIGS. 3B and 3D) representing information about hardware and software constituents that can be encountered on an audiovisual information reproduction device (100.1 to 100.*n*, FIG. 1). The arrays in the second set of arrays (1102, FIGS. 3B and 3D) comprise in particular the name (PGD_NAME, COD_ID, FIG. 3B), the version (PGM_VERSION, FIG. 3B) and the installation date (PGM_RELEASE_DT, FIG. 3B) of each software or hardware component, in the array (SOFTWARE, FIG. 3B). Each row in the second arrays (1102, FIGS. 3B and 3D) corresponds to a software component or a hardware component. The link between at least one table in the second set of arrays (1102, FIGS. 3B and 3D) and a table in the first set of arrays (1101, FIGS. 3A and 3E) is made using the number of the audiovisual information reproduction device (100.1 to 100.*n*, FIG. 1). Thus using this link, it is possible to the server to know all software and hardware components of an audiovisual information reproduction device (100.1 to 100.*n*, FIG. 1) with a given number by searching in each second array for the rows containing the identification number of the audiovisual information reproduction device number (100.1 to 100.*n*).

The first set of arrays (1101, FIGS. 2 and 3A and 3E) is also related to a third set of arrays (1103, JUKE_XXX, IB_XXX, FIGS. 3A and 3C) representing information about the setting of an audiovisual information reproduction device (100.1 to 100.*n*, FIG. 1). A first group of arrays in the third set of arrays (1103, IB_XXX, FIGS. 3A and 3C) contains all operating parameters for the audiovisual information reproduction systems (100.1 to 100.*n*, FIG. 1) and a second group of arrays in the third set of arrays (1103, JUK_XXX, FIGS. 3A and 3C) associates each jukebox with a given set of parameters contained in a group of arrays in the third set of arrays (1103, IB_XXX, FIGS. 3A and 3C). Operating parameters include parameters controlling the volume of the amplifier defined for a jukebox in the tables (JUK_MIXAGE, FIG. 3A), or the parameters defined for the same jukebox in the I-button tables (IB_MIXAGE, FIG. 3A) table, or parameters about the price to be paid (IB and JUK_TUNE_COST) to select at least one song, or telecommunication link parameters (JUK_ISP) with the server (10, FIG. 1), or operating parameters for a remote control if any for an audiovisual information reproduction device (100.1 to 100.*n*, FIG. 1). These parameters are defined for a jukebox in the (JUK_REMOTE_CONTROL, FIG. 3C) table and all remote control operating parameters for all jukeboxes are defined in the (IB_REMOTE_CONTROL, FIG. 3C) table, an audiovisual information reproduction device (100.1 to 100.*n*, FIG. 1) being associated each time with a table (JUK_TUNE_COST, IB_TUNE_COST, JUK_REMOTE_CONTROL, IB_REMOTE_CONTROL, FIG. 3C) in the third set of arrays (1103, FIGS. 3A and 3C). Each row in a table stores operating parameters for an audiovisual information reproduction device (100.1 to 100.*n*, FIG. 1) with a given number (JUK_ID, FIGS. 3A and 3C). The link between the first and third sets of arrays (1103, FIGS. 3A and 3C) may be made for example using the identification number of an audiovisual information reproduction device (100.1 to 100.*n*, FIG. 1). Thus, the server 10 can find all operating parameters of an audiovisual information reproduction device (100.1 to 100.*n*, FIG. 1) with a given number by using this link, by searching in each third set of arrays (1103, FIGS. 3A and 3C) for tables containing the number (JUK_ID, FIGS. 3A and 3C) of the determined audiovisual information reproduction device (100.1 to 100.*n*, FIG. 1), then searching in the rows of these tables for the set of parameters corresponding to the found reference. Similarly, the server can update the information contained in the third set of arrays (1103, FIGS. 3A and 3C) when a message is received from a jukebox. This is done by the server processing the received message immediately that a jukebox enters into communication with the server, in order to determine if the information contained in the database needs to be updated. If the message contains information about modifications to physical parameters, the server adds a new table or replaces the value supplied by the modifications in the row of the table concerned in the third set of arrays (1103, FIGS. 3A and 3C).

The first set of arrays (1101, FIGS. 2, 3*a* and 3E) is also related to at least a fourth set of arrays (1104, SONG, FIGS. 2 and 3A) representing information about songs downloaded on the audiovisual information reproduction systems (100.1 to 100.*n*, FIG. 1). Each song is identified by a unique number (CLT_ID, FIGS. 2 and 3A) Each row in a table in the fourth set of arrays (1104, FIGS. 2 and 3A) represents a song stored on the audiovisual information reproduction device (100.1 to 100.*n*, FIG. 1) identified by its identifier at the beginning of the table. The jukebox periodically (for example daily) sends a message to the server. This message contains the list of all songs installed on the jukebox. Thus, the server compares the list that it receives from the previous list that it had received from the same jukebox and checks if there are any new songs. If there are, the server adds a table corresponding to the addition of one or more new songs in the list of songs available on the jukebox.

A fifth set of arrays (1105, CATALOGUE, FIGS. 2 and 3B) related to the fourth set of arrays (1104, SONG, FIGS.

2 and 3A) through the song identification number (CLT_ID, FIGS. 2 and 3A), comprises a description of each song in the database. Each row in the fifth array (1105, FIGS. 2 and 3B) represents the description of a song in the database (11, FIG. 1). This fifth set of arrays (1105, FIGS. 2 and 3B) in particular is used to determine whether or not a song is available to be downloaded on an audiovisual information reproduction device (100.1 to 100.*n*, FIG. 1) at the request of an operator. In particular, a song is not available unless agreements have been made about copying and playing the song. If these agreements have not been made, the song is present in the database but is not available for downloading to a jukebox. The link between the first set of arrays (1101, FIGS. 2 and 3A) and the fourth set of arrays (1104, FIGS. 2 and 3A) is made through the identification number (JUK_ID, FIG. 3A) of the audiovisual information reproduction device (100.1 to 100.*n*, FIG. 1).

The fourth set of arrays (1104, FIGS. 2 and 3A) is also related to a sixth set of arrays (1106, FIGS. 2 and 3B) representing information about filters that an operator can use to prohibit downloading one or a plurality of songs determined by groups of specific tables. The song (or songs) is identified by a first group of specific tables identified by the identification number of the song(s) (FLT_CATA-LOGUE, FIGS. 2 and 3B), or by a second group of specific tables identified by the artist's identification number of the song(s) (FLT_ARTIST, FIGS. 2 and 3B), or a third group of specific tables identified by the identification number of the company that published the song(s) (FLT_LABEL, FIGS. 2 and 3B), or by a fourth group of specific tables identified by the identification number of the category (FLT_CAT-EGORY, FIG. 3B) to which the song(s) belong. Each group of tables in a sixth set of arrays (1106, FIGS. 2 and 3B) represents a given filter for a song, an artist, a disk publisher or a category. One of the tables (JUK_FILTER, FIGS. 2 and 3B) in the sixth set of arrays (1106, FIGS. 2 and 3A) is also linked to the first set of arrays (1101, FIG. 3A) and comprises the description (JUK_DESC, FIG. 3B) of the filter assigned to each jukebox by the filter identification number (JUF_ID) that is associated with the given jukebox identifier (JUK_ID) in each table (JUKEBOX, 1101, FIG. 3A). The first array (1101, FIG. 3A) also includes an argument corresponding to the filter number (JUF_ID). Thus, the filter on a given jukebox is defined by searching in the sixth set of arrays (1106, FIGS. 2 and 3B) for the table(s) containing the filter number (JUF_ID). Similarly, an operator can assign the same filter number to one or a plurality of audiovisual information reproduction systems (100.1 to 100.*n*, FIG. 1).

The first array (1101, FIGS. 3A and 3E) is also related by the identifier (JUK_ID) to a seventh set of arrays (1107, JUKE_LOCATION, FIG. 3A) representing information about the operators of audiovisual information reproduction systems (100.1 to 100.*n*, FIG. 1). This information comprises in particular an operator identifier (OPE_ID, FIG. 3A) that accesses a table (OPERATOR, FIG. 3A) specific to each operator. Each array (WAREHOUSE, ADDRESS, CONTRACT, FIG. 3A) in the seventh set of arrays (1107, FIG. 3A) corresponds to a table associated with a given operator. The relation between the first array (1101, FIG. 3A) and the seventh array (1107, FIG. 3A) is made through the operator identifier (OPE_ID). In order to achieve this, the first array (1101, FIG. 3A) therefore includes an argument (JUK_ID) used to find the associated argument (OPE_ID) corresponding to the owner or renter operator of the audiovisual information reproduction device (100.1 to 100.*n*, FIG. 1) in the jukebox locating table (JUKE_LOCATION, FIG. 3A). Thus, in particular this relation enables the server to determine the numbers of the audiovisual information reproduction devices (100.1 to 100.*n*, FIG. 1) managed by the operator for a given operator number. The (JUKE_LOCATION, FIG. 3A) table in the seventh set of arrays (1107, FIG. 3A) also includes the date (JUL_START_DT) on which the jukebox was installed for rental in the installation premises, and the expiration date of the rental.

The first set of arrays (1101, FIGS. 2 and 3A and 3E) is also related to an eighth set of arrays (1108, FIGS. 3A and 3E) representing information about the log for an audiovisual information reproduction device (100.1 to 100.*n*, FIG. 1). This information actually represents all events that take place on each audiovisual information reproduction device (100.1 to 100.*n*, FIG. 1) and in particular, every time that a song is played, a row is written in a table in the eighth set of arrays (1108, PLAY_LOG, FIG. 3A). Similarly, every time that an amount of money is inserted into the audiovisual information reproduction device (100.1 to 100.*n*, FIG. 1), a new row is written, for example in another array of the same type (SYSTEM_LOG, FIG. 3A). In particular, the information collected in these arrays is used to calculate fees to be paid to the artists or publishers or writers of the played songs, and also to find out exactly what songs were played during a day, a week or a given period, on a determined audiovisual information reproduction device (100.1 to 100.*n*, FIG. 1).

Figures 1, 3B:
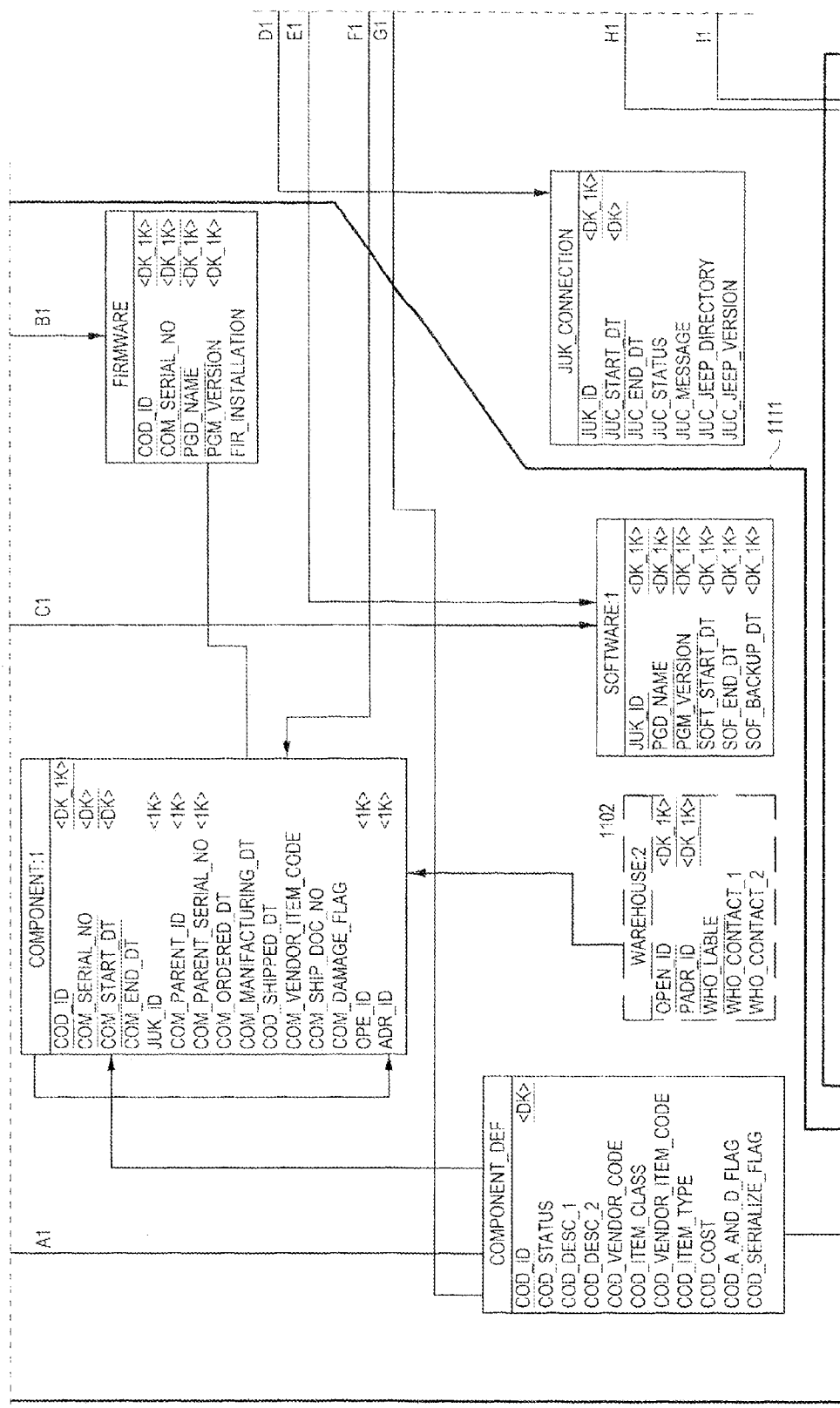
Figures 2, 3B:
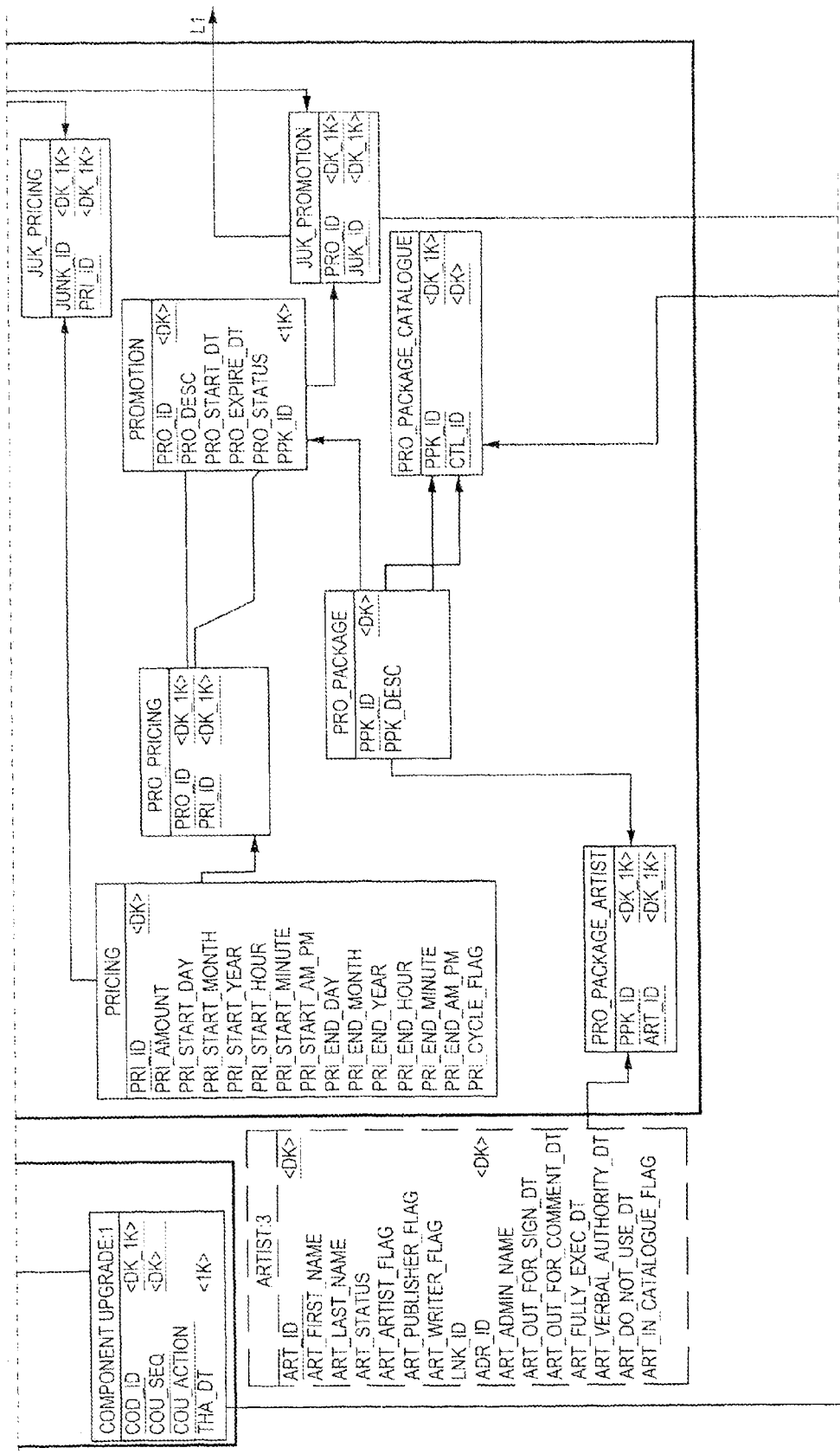
Figures 3, 3B:
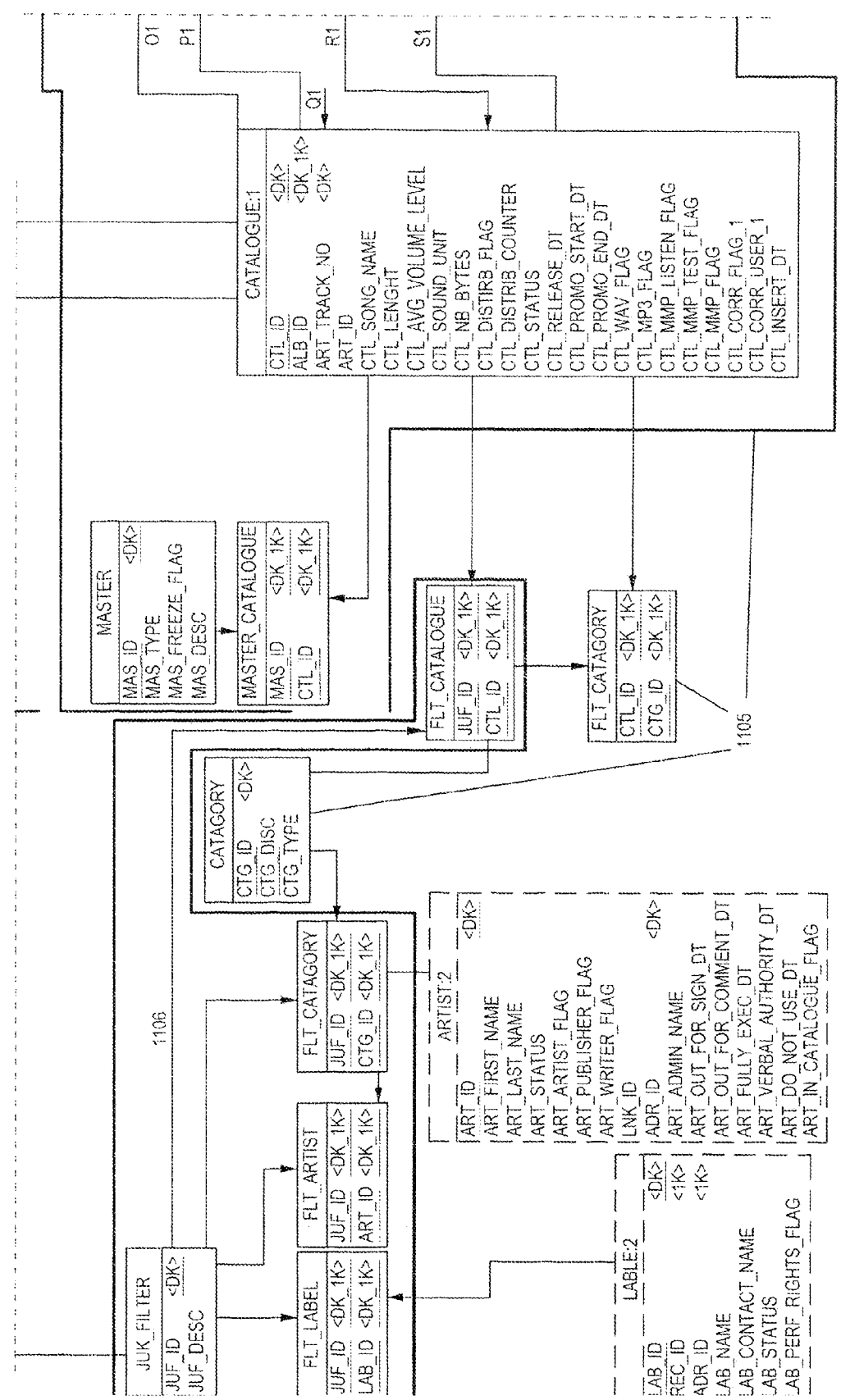
Figures 1, 3C:
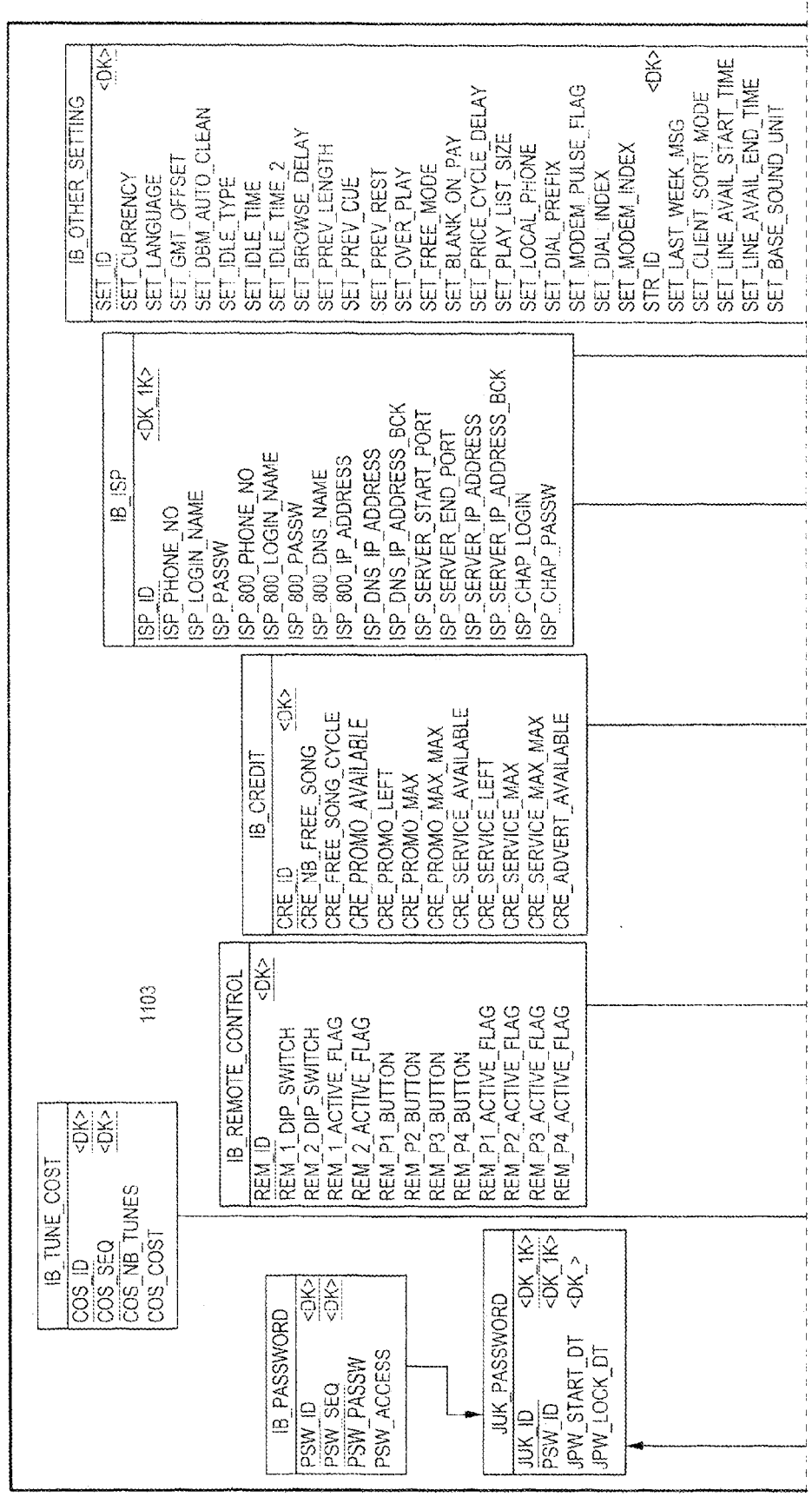
Figures 2, 3C:
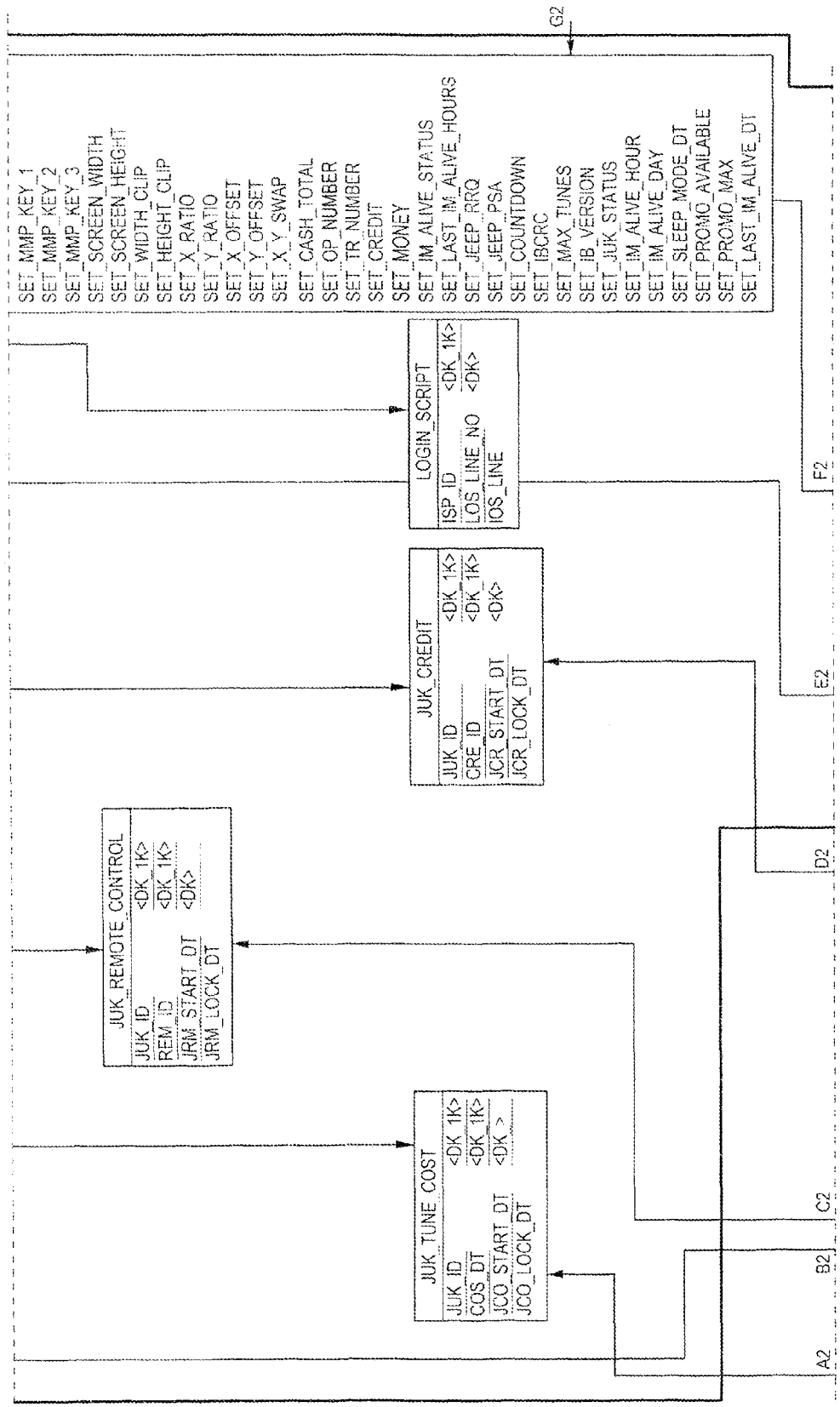
Figure 3D:
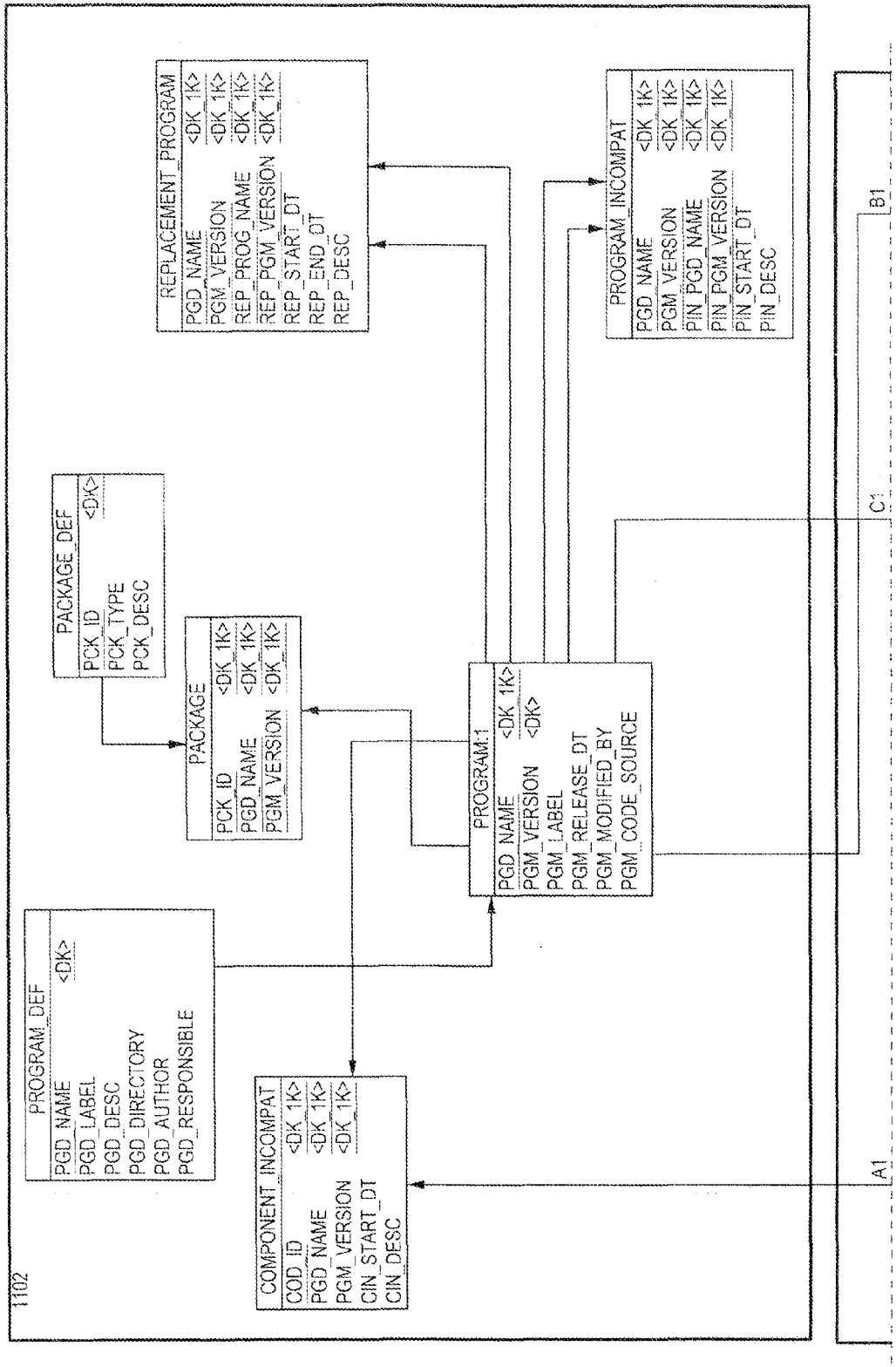
Figures 1, 3E:
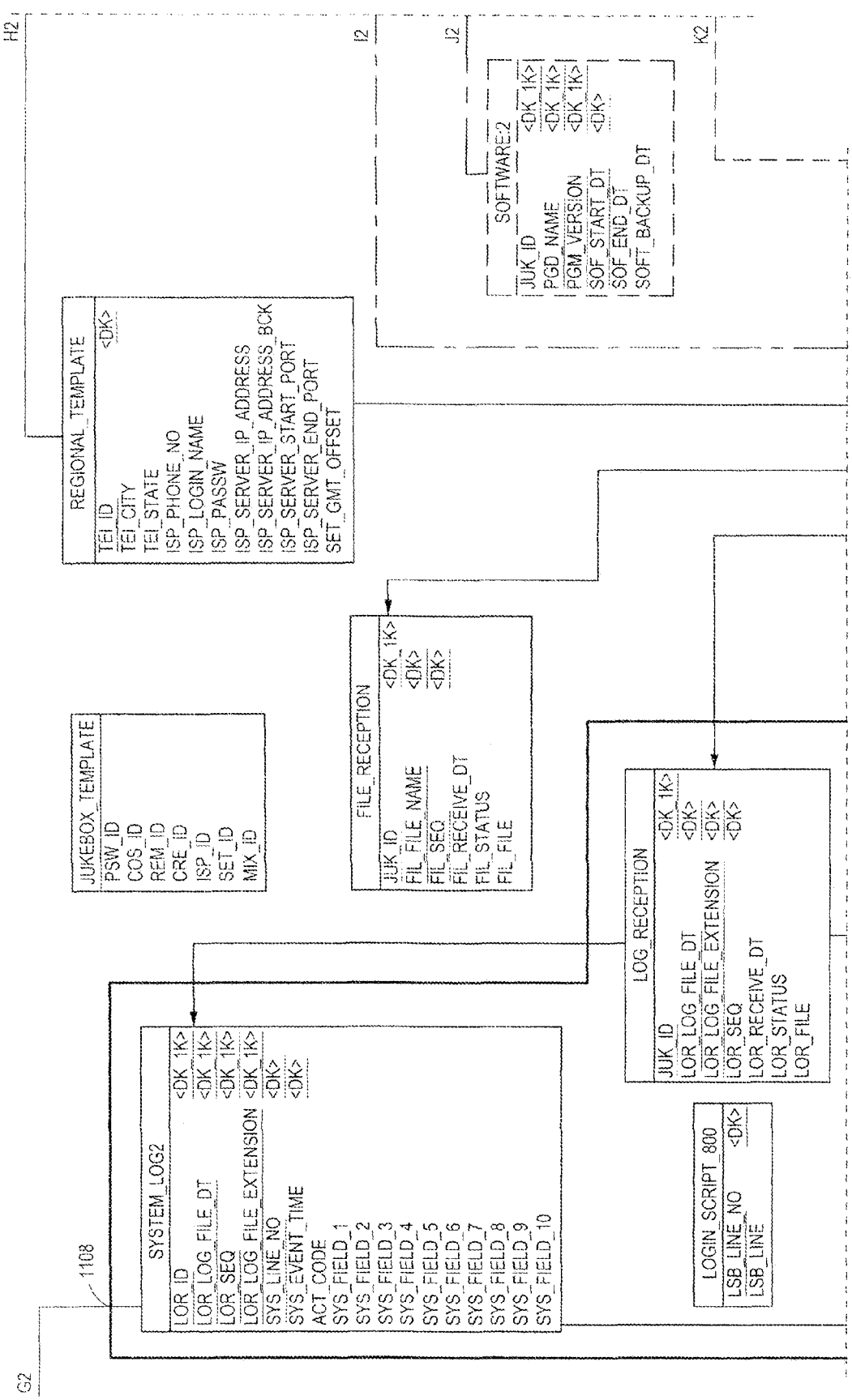
Figures 2, 3E:
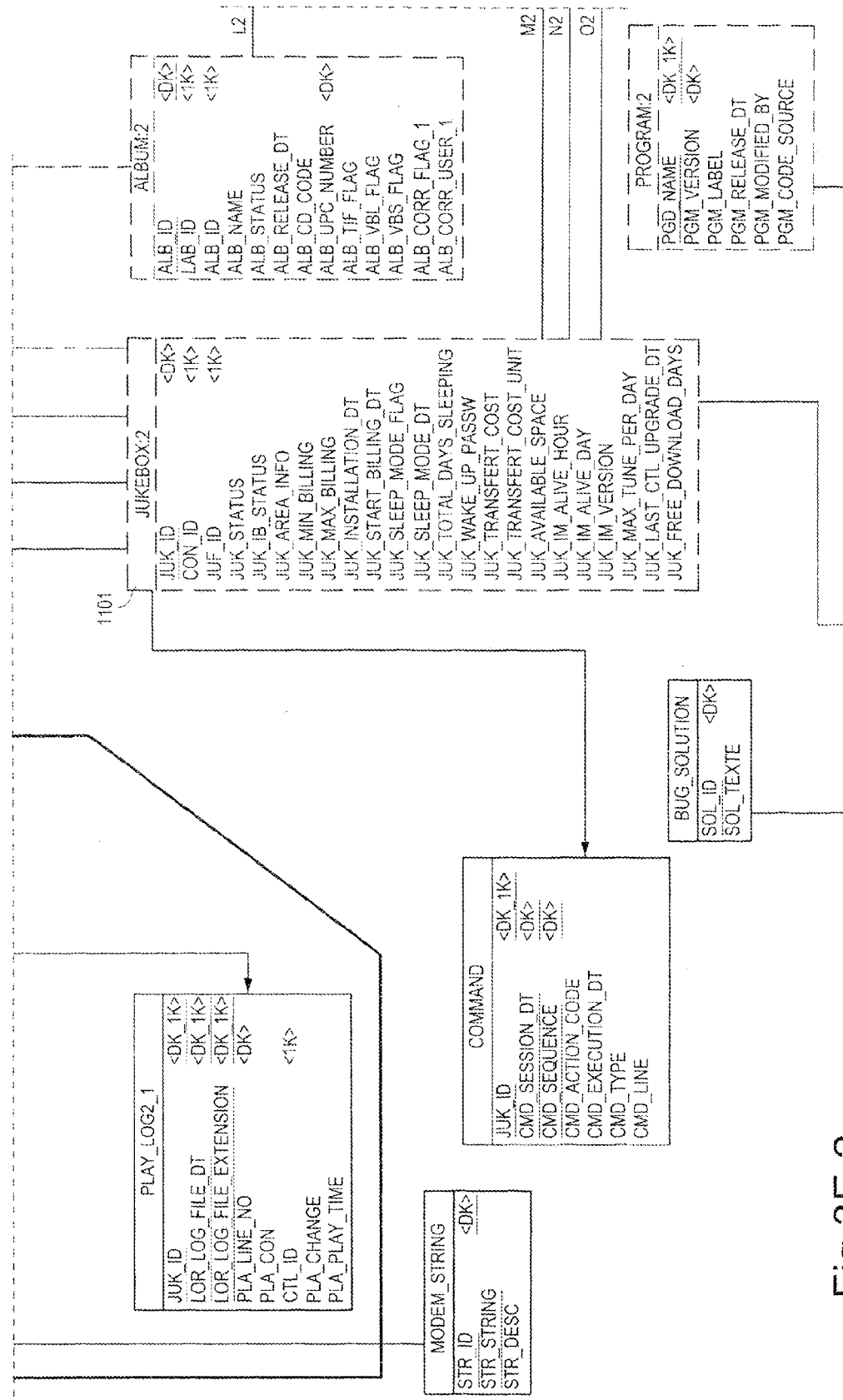
Figures 3, 3E:
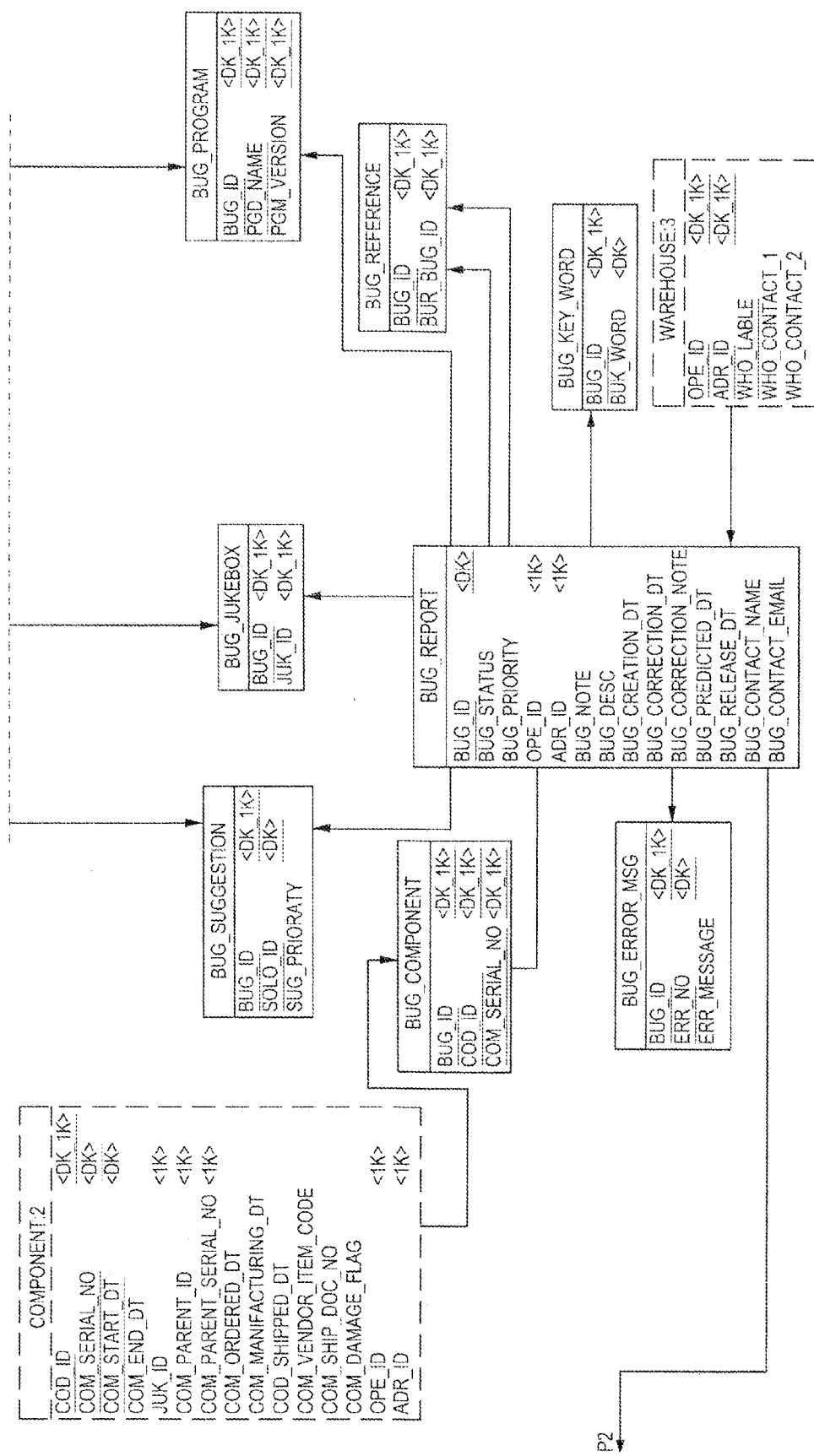

For example, information about the fee calculations may be centralized in a ninth set of arrays (1109, FIG. 3F) comprising groups of tables (JUKE_DAY_REPORT, FIG. 3F) related to the eighth set of arrays (1108, FIGS. 3E and 3A). The eighth set of arrays (1108, SYSTEM_LOG, PLAY_LOG, FIGS. 3E and 3A) is updated every time that the server receives a log file during a communication setup between the server and a jukebox. Each event contained in the log file transmitted by the jukebox will be processed by the server. This processing consists of adding a row in one of the tables (1108, SYSTEM_LOG, PLAY_LOG, FIGS. 3A and 3E) in the eighth set of arrays for each event. For example, events may be sorted into two categories. The first events are songs played on the jukebox and are memorized in the group of arrays (PLAY_LOG, FIGS. 3A, 3E and 3F), and the second events are other operations that occurred on the jukebox, for example such as insertion of amounts of money in payment means and are memorized in the SYSTEM_LOG group of arrays, FIGS. 3A and 3E.

Similarly, a copy of a song made on a jukebox will be paid for by the payment of a royalty to the song publisher. In order to do this, the fourth and fifth sets of arrays (1104, 1105 FIG. 3A, FIGS. 3B and 2) comprise all information necessary to determine the number of songs on each jukebox. The fourth set of arrays (SONG, 1104, FIG. 3A) includes the list of all songs stored on each jukebox. A first set of tables (MASTER_CATALOGUE) is used to determine the list of songs that were initially installed in each jukebox, the fifth set of arrays (CATALOGUE) identifies each song and in particular is used to determine the amount of the royalties for each song and the persons who will receive them. The royalty is then assigned by the use of an array (CONTRACT FIG. 3A) in the seventh set of arrays (1107, FIG. 3A).

Finally, the jukebox operator will be charged a fee for each use of the jukebox. This fixed fee is invoiced using the group of tables (1108, SYSTEM_LOG, FIGS. 3A and 3E) in the eighth set of arrays. Each table in this group of tables corresponds to an event that occurred on each jukebox. Thus, each time that an amount of money was inserted in a jukebox, another table was added. This eighth set of arrays is related to a group of tables in the ninth set of arrays (1109, JUKEBOX_REPORT, FIG. 3F) that defines the amount of money added into each jukebox for each day and for each jukebox of an operator. Similarly, the details of operations carried out during the day can be determined for each jukebox through another group of tables in the ninth set of arrays (1109, JUKEBOX_REPORT, FIG. 3F).

The first set of arrays (1101, FIGS. 2 and 3A and 3E) is also related to at least one tenth set of arrays (1110, INSTRUCTION FIG. 3F) representing information about instructions that will be sent to at least one determined audiovisual information reproduction device (100.1 to 100.*n*, FIG. 1). At least one group of tables in the tenth set of arrays (1110, INSTRUCTION_DEF, FIG. 3F) contains a description of the instructions (INS_DESC, FIG. 3F). Similarly, the relation between the first set of arrays (1101, FIGS. 2, 3A and 3F) and the tenth set of arrays (1110, FIG. 3F) is made using the identification number (JUK.ID) of the audiovisual information reproduction device (100.1 to 100.*n*, FIG. 1). Thus, all instructions intended for a determined audiovisual information reproduction device (100.1 to 100.*n*, FIG. 1) can be collected by the server, and downloaded on the identified jukebox, when it sets up communication with the server. For example, these instructions may be an update to at least one software (INS_SOFTWARE, FIG. 3F) installed on the audiovisual information reproduction device (100.1 to 100.*n*, FIG. 1), downloading of new songs (INS_CATALOGUE, INS_ALBUM, FIG. 3F) ordered by the operator of the audiovisual information reproduction device (100.1 to 100.*n*, FIG. 1), or a modification of the operating parameters (INS_IBUTTON) of the audiovisual information reproduction device (100.1 to 100.*n*, FIG. 1). The group of tables (1110, INSTRUCTION, FIG. 3F) containing the jukebox identification (JUK-ID) and an identification of the instructions (INS_ID) to be transmitted to this jukebox is systematically read by the server 10 when an audiovisual information reproduction device (100.1 to 100.*n*, FIG. 1) sets up a communication with the server 10 in order to verify whether or not the instructions stored in the tenth set of arrays (1110, FIG. 3F) are to be used by the audiovisual information reproduction device (100.1 to 100.*n*, FIG. 1) that has just set up a communication with the server 10. The link between the different groups of tables in the tenth set of arrays is made using an instruction identification number (INS_ID). The set of instructions contained in the tenth set of arrays (1110, FIG. 3F) can be prepared and stored in the database before the date on which these instructions are to be applied in practice on the jukebox. These instructions are not actually sent to the jukebox until the required date of application when the jukebox sets up communication with the server 10.

The first set of arrays 1101 is related to at least one eleventh set of arrays (1111, JUKE_PROMOTION, FIG. 3B) representing information about setting up promotional operations on jukeboxes by JUK_ID through the (PRICING, FIG. 3B) table that indicates the access argument PRI_ID to one of the tables in the eleventh set of arrays (1111, FIG. 3B). These operations consist essentially of making modifications to the prices of some songs installed on the jukeboxes. For example, the songs concerned by the promotions may be ordered by a promoter other than the jukebox operator. For example, these songs can be ordered and fees for the distribution of these songs can be paid by the promoter rather than by the operator. Information about songs for which a promotion is being made is contained in one of the eleventh arrays (1111, PRO_PACKAGE, FIG. 3B). Similarly, price modifications for songs included in the promotion are contained in one of the eleventh arrays (1111, PRICING, FIG. 3B). Songs ordered by the promoter are paid for making use of a table (PRO_PACKAGE_CATALOGUE, FIG. 3B) that groups identifiers (CTL_ID) of songs included in the promotion. This table is related by an argument (PPK_ID, FIG. 3B) identifying groups of songs with a table (PROMOTION, FIG. 3B) containing the description of the promotion. This table (PROMOTION, FIG. 3B) can also be used to identify the promoter. Thus, during the calculation of royalties (described above) the server refers to the table (PRO_PACKAGE_CATALOGUE, FIG. 3B) to determine if the identifiers of the songs played on a jukebox are contained in this table. If an identifier of a song played on the jukebox belongs to this table, then the royalty will be invoiced to the promoter corresponding to the identifier (PRO_ID, FIG. 3B) of the promotion to which the song belongs.

A non-restrictive description of a plurality of groups of specific tables in the database will now be given, with reference to FIGS. 3A to 3F.

The ACTION specific tables group belongs to the eighth set of arrays (1108, FIGS. 3A and 3F) and contains definitions of actions used in a group of specific tables SYSTEM_LOG (described later) associated with a jukebox (JUK_ID). Each action is identified in the ACTION specific tables group by a code (ACT_CODE). Similarly, each ACTION specific table corresponds to a particular action. Thus for example, the ACTION table for which the action code (ACT_CODE) is equal to "M" contains the description of the action consisting of inserting a given amount in a jukebox.

The ADDRESS specific tables group belongs to the seventh set of arrays (1107, FIG. 3A) and contains all addresses of the various persons involved in the system according to the invention, in other words operators, disk publishers, artists. Each table corresponds to a different address identifier (ADR_ID). One address (ADR_ADDRESS_1) may be identical for a plurality of players and may be found in different tables.

The ALBUM specific tables group belongs to the fifth set of arrays (1105, FIGS. 2 and 3B), and contains all information about albums contained in the songs bank, in other words the name (ALB_NAME), the main artist (ART_ID), and the disk publisher (LAB_ID). Each album is identified by a unique number (ALB_ID). One specific table in this group of tables contains the identification of an album.

The ARTIST specific tables group belongs to the fifth set of arrays (1105, FIGS. 2 and 3B) and contains information about artists and/or publishers and/or authors of songs, for example such as validations of agreements for playing and copying of songs. One specific table in this table group contains the identification of an artist or a publisher or a writer.

The BUG_COMPONENT, BUG_ERROR_MSG, BUG_JUKEBOX, BUG_KEYWORD, BUG_PROGRAM, BUG_REFERENCE, BUG_REPORT, BUG_SOLUTION, BUG_SUGGESTION arrays shown in FIG. 3E are used to archive, solve or propose solutions to malfunctions that occur in remote management of jukeboxes or in the operation of jukebox programs or components.

The CATALOGUE specific tables group belongs to the fifth set of arrays (1105, FIGS. 2 and 3A and 3B), and contains information about songs contained in the database. A table in this group of tables identifies the song. In particular, each table includes a song name (CLT_SONG_NAME) and its length (CLT_LENGTH).

The CATEGORY specific tables group belongs to the fifth set of arrays (1105, FIGS. 3A and 3B) and contains the list of song categories, in other words the category name (CTG_TYPE), its description (CTG_DESC) and an identification number (CTG_ID). A category includes all songs of a given type, for example jazz songs will be in one category, and Christmas carols in another category.

The COLLABORATOR specific tables group belongs to the eighth set of arrays (1108, FIGS. 3A and 3B) and contains names of song writers. An argument (COL_TYPE) will be assigned a defined value, for example W, to denote a writer. This differentiation is used for calculating royalties.

The COMMAND specific tables group, FIG. 3E, contains all commands that are exchanged between the server and the jukebox when a communication is setup between them. A table in this tables group corresponds to a command.

The COMPONENT specific tables group, FIG. 3B, contains the list of all hardware components that may be installed on a jukebox. In particular, each table contains the serial number (COM_SERIAL_NO) of each component and its installation date (COM_STRAT_DT).

The COMPONENT_DEF specific tables group belongs to the second set of arrays (1102, FIGS. 3B and 3D) and contains a precise description of all components listed in the COMPONENT specific tables group. In particular, each table in this group of tables contains the cost of components (COD_COST), and the supplier identification (COD_VENDOR_CODE).

The COMPONENT_INCOMPAT specific tables group belongs to the second set of arrays (1102, FIGS. 3B and 3D) and contains information about any incompatibilities between the various hardware components that can be installed on a jukebox.

The COMPONENT_UPGRADE specific tables group belongs to the second set of arrays (1102, FIGS. 3B and 3D) and is used to keep a trace of all modifications made to the COMPONENT_DEF specific tables group.

The CONTRACT specific tables group, FIG. 3A belonging to the seventh set of arrays 1107 is used to define the person(s) who will receive the royalties each time that each song is played.

The CLT_CATEGORY specific tables group belongs to the fifth set of arrays (1105, FIGS. 3A and 3B) and is used to associate a song with at least one category defined in the CATEGORY specific tables group.

The EVENT specific tables group belongs to the tenth set of arrays (1110, FIG. 3F) and is used to put instructions into groups (defined later) such that they are executed at a given moment defined in the EVENT_DEF specific tables group.

The EXECUTED_INSTRUCTION specific tables group belongs to the tenth set of arrays (1110, FIG. 3F) and is used to archive an instruction when it has been executed on the jukebox concerned.

The FILE_RECEPTION specific tables group in FIG. 3E contains all text files received from jukeboxes during a communication between the server and the jukebox.

The FIRMWARE specific tables group belongs to the second set of arrays (1102, FIGS. 3B and 3D) and is used to associate a hardware component described in the COMPONENT tables group and software described in the PROGRAM tables group intended to operate with the component.

The FLT_ARTIST specific tables group belongs to the sixth set of arrays (1106, FIG. 3B) and contains a definition of filters applicable to artists installed on jukeboxes. These filters are read every time that a song is to be downloaded on a jukebox, such that a song with an artist belonging to a filter is not downloaded on the jukebox concerned by the filter. Each table in this tables group corresponds to a given filter (JUF_ID) and a given artist (ART_ID).

The FLT_CATALOGUE specific tables group, FIG. 3B, is similar to the previous group but the filter applies to a song.

The FLT_CATAGORY specific tables group, FIG. 3B, is similar to the previous group but the filter applies to a song category.

The FLT_LABEL specific tables group, FIG. 3B, is similar to the previous group but the filter applies to a disk publisher (label).

Figures 1, 3F:
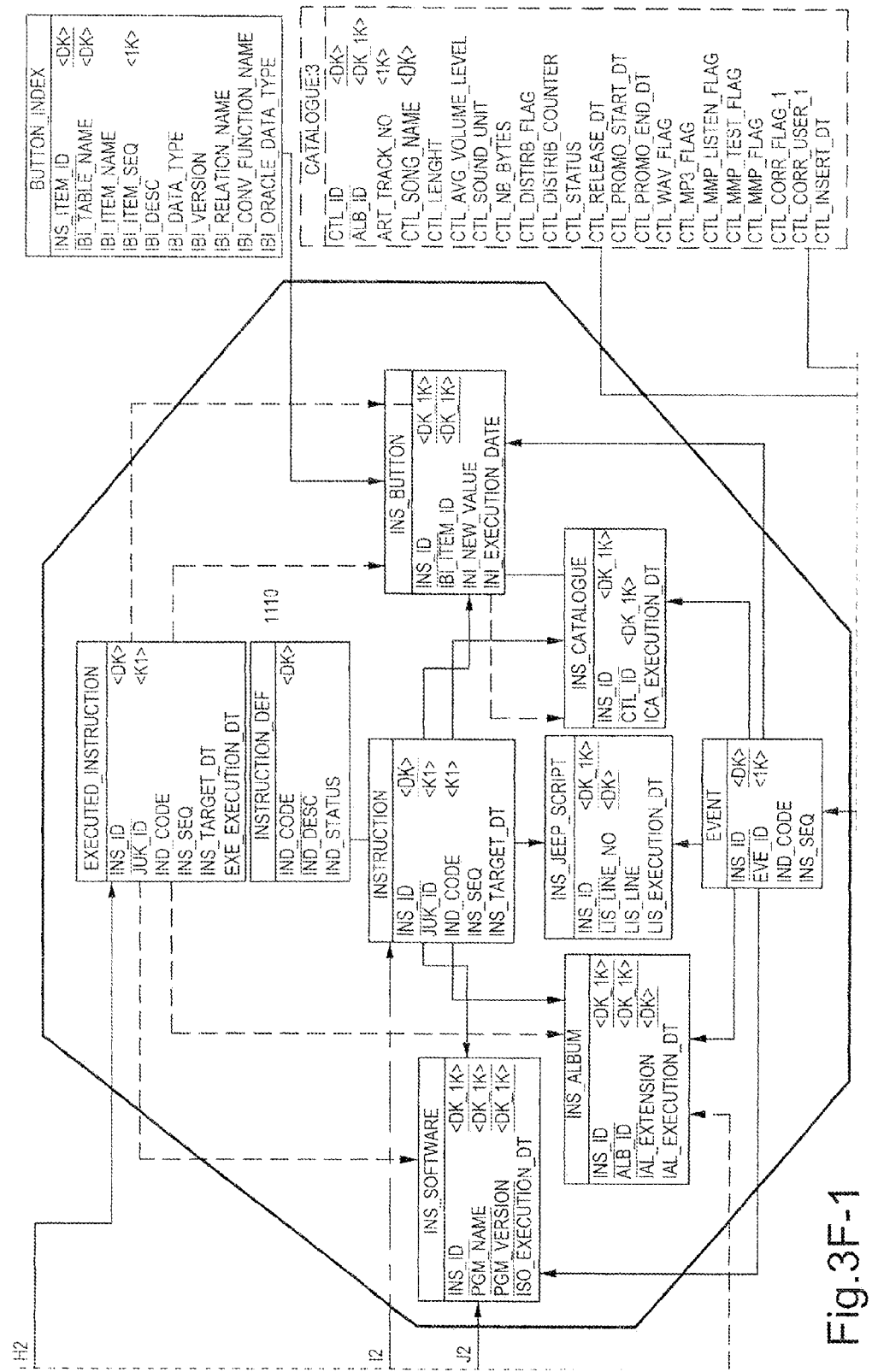
Figures 2, 3F:
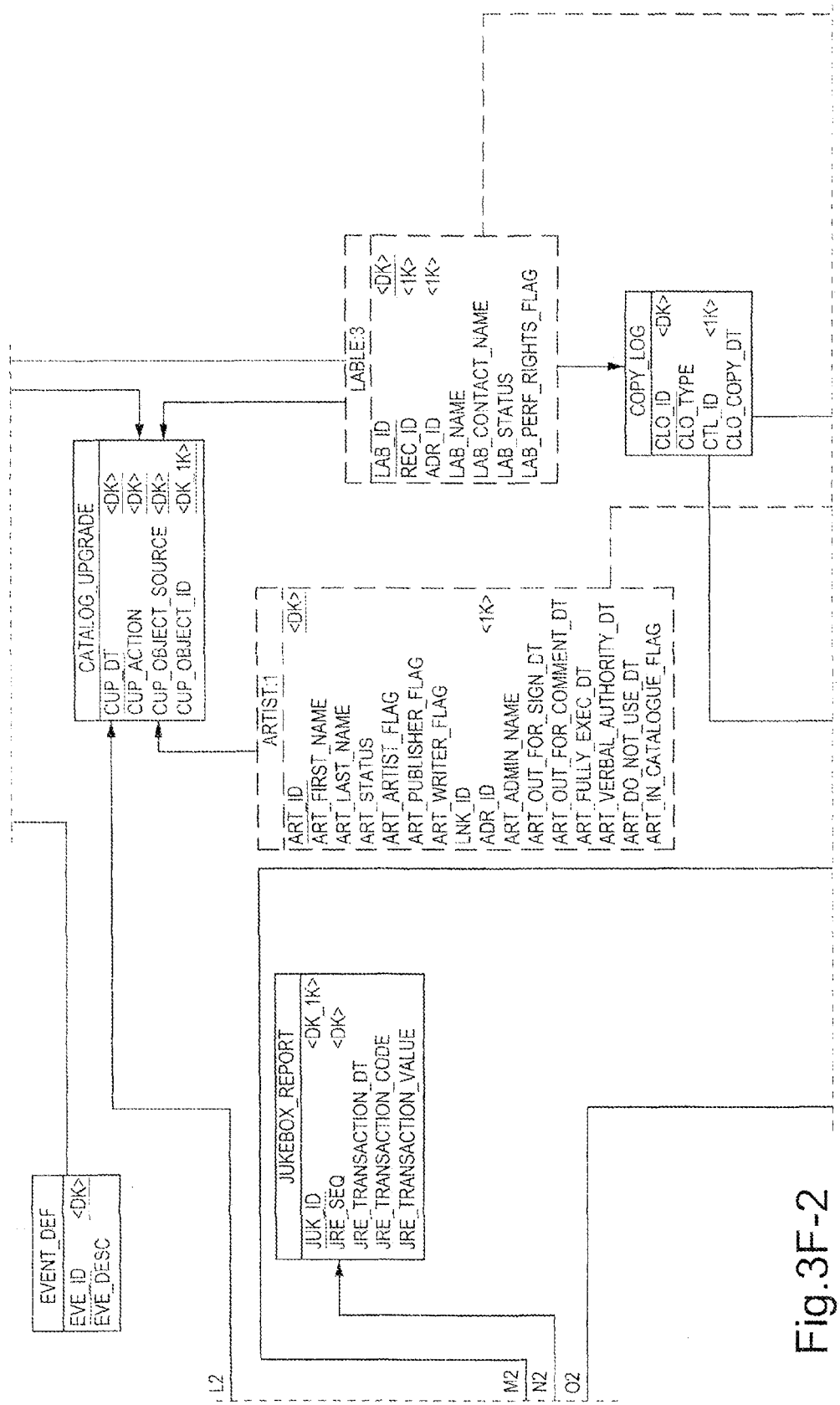
Figures 3, 3F:
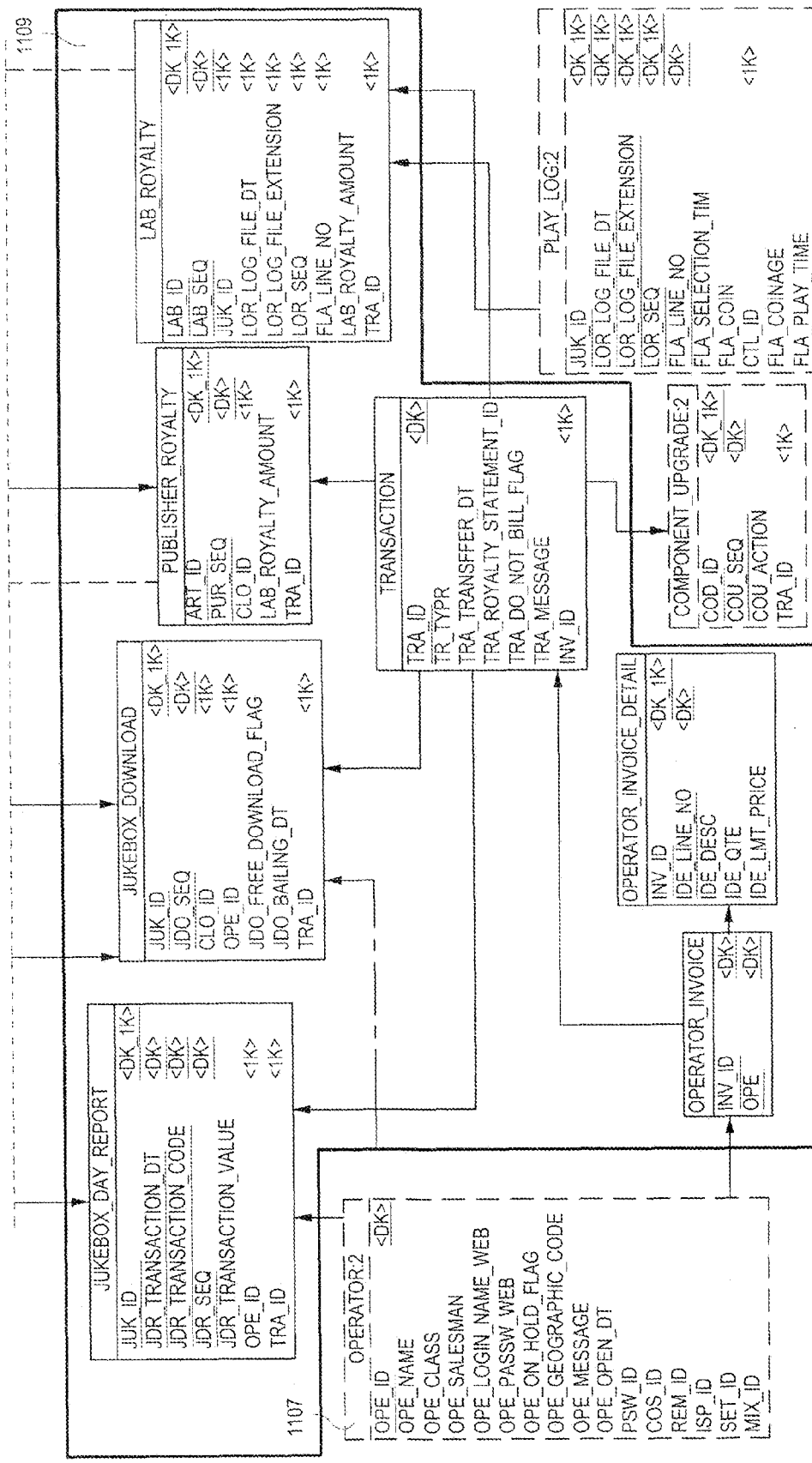

The IBUTTON_INDEX specific tables group, FIG. 3F sets up a link between the identification of an element of the Ibutton (defined above) and the identification of the same element in the database.

The IB_CREDIT specific tables group belongs to the third set of arrays (1103, FIGS. 3A and 3C) and contains information about free credits that can be used on a jukebox, this information being contained in the Ibutton of the jukeboxes. A credit shows the amount of money that has to be paid before a song can be played on a jukebox. This information is used to determine the maximum available number of credits, and particularly how many credits are available. Each table in this group of tables is applicable to a particular credit type.

The IB_ISP specific tables group belongs to the third set of arrays (1103, FIGS. 3A and 3C) and contains information necessary to enable an connection to Internet, this information being contained in the Ibutton of the jukeboxes. Each table in this tables group contains in particular the connection parameters (ISP_SERVEUR_IP_ADDRESS, . . . ), the user name (ISP_LOGIN_NAME), the password (ISP_PASSWORD), and the telephone number of the Internet Service Provider (ISP) (ISP_PHONE_NO). Each table corresponds to a given connection with a given service provider.

The IB_MIXAGE specific tables group belongs to the third set of arrays (1103, FIGS. 3A and 3C) and contains all information about sound settings on a jukebox, this information being contained in the Ibutton of the jukeboxes. A table in this tables group corresponds to a given sound setting.

The IB_OTHER_SETTING specific tables group belongs to the third set of arrays (1103, FIGS. 3A and 3B) and contains all information about the settings of jukeboxes contained in the Ibutton. Each table in this tables group comprises particularly the jukebox language (SET_LANGUAGE), the availability of the telephone line (SET_LINE_AVAIL_STRAT_TIME, SET_LINE_AVAIL_END_TIME) and the version of the Ibutton (SET_IB_VERSION). Each table corresponds to a set of determined parameters.

The IB_PASSWORD specific tables group belongs to the third set of arrays (1103, FIGS. 3A and 3B) and contains passwords assigned to a jukebox so that the jukebox can operate.

The IB_REMOTE_CONTROL specific tables group belongs to the third set of arrays (1103, FIGS. 3A and 3B) and contains setting parameters for a remote control that can be used to make a jukebox operate. These parameters correspond to parameters memorized in the Ibutton of a jukebox.

The IB_TUNE_COST specific tables group belongs to the third set of arrays (1103, FIGS. 3A and 3B), and contains the setting of prices to be paid on a jukebox so that one or a plurality of songs can be selected.

All IB_XXX table groups contain all possible settings of a jukebox managed by the system according to the invention. The assignment of a particular setting, in other words a specific table in a group of tables IB_XXX to a given jukebox (JUK_ID) is made through another specific tables group JUK_XXX (described later).

The INSTRUCTION specific tables group belongs to the tenth set of arrays (1110, FIG. 3F) and includes all instructions that must be transmitted to a jukebox. Each instruction is defined by a number (INS_ID) and the destination jukebox is identified by its number (JUK_ID). Each table in this group of tables corresponds to an instruction that is to be sent to a jukebox. Each table can also be used to determine the instruction type through a code (INS_CODE). Each table also comprises the date (INS_TARGET_DT) starting from which the server 10 can transmit instructions to the jukebox. Thus, it is possible to prepare and store instructions to be sent to the jukebox in advance.

The INSTRUCTION_DEF specific tables group belongs to the tenth set of arrays (1110, FIG. 3F) and comprises a description of all instruction types. The link between this tables group and the INSTRUCTION specific tables group is made using the instruction code INS_CODE.

The INS_ALBUM specific tables group belongs to the tenth set of arrays (1110, FIG. 3F) and contains instructions about the addition, modification or deletion of an album. Each table comprises an argument (IAL_EXECUTION_DT), that assures that the instruction corresponding to the table has been executed in its entirety.

The INS_CATALOGUE specific tables group, FIG. 3F, is similar to the previous specific tables group, but the instructions relate to a song.

The INS_IBUTTON specific tables group in FIG. 3F is similar to the specific tables group described above, but the instructions concern the modification of a parameter stored in the Ibutton.

The INS_SOFTWARE specific tables group, FIG. 3F, similar to the previous specific tables group except that the instructions concern software.

The INS_JEEP_SCRIPT specific tables group belongs to the tenth set of arrays (1110, FIG. 3F) and includes instructions about the execution of an order on a jukebox. An order may create, move, rename or delete a file on the jukebox. This array also comprises the command line corresponding to the operations to be carried out.

The JUKEBOX specific tables group belongs to the first set of arrays (1101, FIGS. 2, 3A and 3E) and includes information about the installation of a jukebox. Each table in this tables group comprises in particular a jukebox identification number (JUK_ID), its start up date (JUK-INSTALLATION_DT), its status (JUK_STATUT), etc. Each table corresponds to the description of a jukebox on the network.

The JUKEBOX_LOCATION specific tables group belongs to the seventh set of arrays (1107, FIG. 3A) and contains all information about the location of the jukebox and the company renting the jukebox.

The JUK_CONNECTION specific tables group can be used to archive all start and end dates of communications between a jukebox and the server.

The JUK_CREDIT specific tables group belongs to the second set of arrays (1102, FIGS. 3A and 3B) and can be used to make a link with the specific tables group IB_CREDIT so that credits can be assigned to a particular jukebox (JUK_ID). This group of tables can also be used to archive the different configurations of credits that have been validated on a jukebox, but which are no longer authorized. The current validity setting for a given jukebox (JUK_ID) is contained in the specific table that has the most recent date (JCR_START_DT). Other tables are kept as archives.

The JUK_FILTER specific tables group belongs to the sixth set of arrays (1106, FIG. 3B) and contains descriptions of all filters that are installed on jukeboxes. Each table in this tables group corresponds to a filter identified by a unique number (JUF_ID).

The JUK_ISP specific tables group belongs to the second set of arrays (1102, FIGS. 3A and 3C) and makes the link with the IB_ISP specific tables group to configure the connection of a particular jukebox (JUKE_ID). This tables group is also used to archive the different connection settings that have been validated on a jukebox, but that are no longer authorized. The current validity setting for a given jukebox (JUKE_ID) is contained in the specific table with the most recent date (JIS_START_DT). Other tables are kept as archives.

The JUK_MIXAGE specific tables group belongs to the second set of arrays (1102, FIGS. 3A and 3C) and is used to make the link between the IB_MIXAGE specific tables group and the sound setting on a specific jukebox (JUK_ID). This tables group also archives the different sound settings that have been validated on a jukebox, but that are no longer authorized. The setting that is currently valid for a given jukebox (JUK_ID) is contained in the specific table with the most recent date (JMI_START_DT). Other tables are kept as archives.

The JUK_OTHER_SETTING specific tables group belongs to the second set of arrays (1102, FIGS. 3A and 3C) and makes the link between the IB_OTHER_SETTING specific tables group and the setting of a jukebox. This tables group is also used to archive the different settings that have been validated on a jukebox, but that are no longer authorized. The setting that is currently valid for a given jukebox (JUK_ID) is contained in the specific table with the most recent date (JOT_START_DT). Other tables are kept as archives.

The JUK_PASSWORD specific tables group belongs to the second set of arrays (1102, FIGS. 3A and 3C) (and is used to make the link between the IB_PASSWORD specific tables group and a jukebox. Each table in this tables group is used to assign a set of passwords to a given jukebox using its number (JUK_ID). This tables group is also used to archive the different sets of passwords that have been validated on a jukebox but that are no longer authorized. The setting that is currently valid for a given jukebox (JUK_ID) is contained in the specific table with the most recent date (JPW_START_DT). Other tables are kept as archives.

The JUK_PRICING specific tables group belongs to the eleventh set of arrays (1111, FIGS. 2 and 3B) and is used to make the link between a PRICING array (described above) and a jukebox defined by its number (JUK_ID). Each table in this group of tables is used to assign a promotion period defined in the PRICING specific tables group to a jukebox identified by its identifier (JUK_ID).

The JUK_PROMOTION specific tables group belongs to the eleventh set of arrays (1111, FIGS. 2 and 3B) and is used to make the link between the PROMOTION specific tables group (described below) and a jukebox. Each table in this group of tables is used to assign a particular promotion (PROD-ID) to a jukebox defined by its identifier (JUK_ID).

The JUK_REMOTE_CONTROL specific tables group belongs to the second set of arrays (1102, FIG. 3B) and is used to make the link between the IB_REMOTE_CONTROL specific tables group and a jukebox. Each table in this tables group is used to assign a particular setting (REM_ID) to a remote control of a jukebox defined by its number (JUK_ID). This tables group is also used to archive different settings of the remote control that have been validated on a jukebox but that are no longer authorized.

The JUK_TUNE_COST specific tables group belongs to the second set of arrays (1102, FIGS. 3A and 3B) and is used to make the link between the IB_TUNE_COST specific tables group and a jukebox. This array is used to assign a choice of the price of particular songs (COS_ID) to a jukebox defined by its number (JUK_ID). This array is also used to archive different price choices validated on the jukebox but that are no longer authorized. The currently valid setting for a given jukebox (JUK_ID) is contained in the most recent specific table (JRM_START_DT). Other tables are kept as archives.

The LABEL specific tables group belongs to the fifth set of arrays (1105, FIGS. 3A and 3B) and describes all distribution names of disk publishers contained in the database. Each table in this tables group contains in particular the identifier of the address of the disk publisher (ADR_ID), the complete address being stored in the ADDRESS specific tables group, an identification number (LAB_ID), and the name of the disk publisher. Each table corresponds to a disk publisher.

The LABEL_ROYALTY specific tables group belongs to the ninth set of arrays (1109, FIG. 3F) and contains information necessary for calculating fees payable to disk publishers. Each table in the tables group is linked particularly to the PLAY_LOG array (described later) that memorizes all distributions of songs originating on jukeboxes. The link is made by the jukebox identification number.

The LOGIN_SCRIPT specific tables group belongs to the second set of arrays (1102, FIGS. 3B and 3D) and contains the startup scripts associated with Internet service providers.

The LOG_RECEPTION specific tables group belongs to the eighth set of arrays (1108, FIGS. 3A and 3E) and is used to archive all log files in the jukeboxes received by the server. Each table in this tables group contains in particular the number (JUK_ID) of the jukebox that sent the log file, the reception date (LOG_RECEIVE_DT), and the transmitted file (LOG_FILE).

The MASTER specific tables group belongs to the fifth set of arrays (1105, FIGS. 3A and 3B) and defines lists of about 750 songs in the same style that may form a starting point for a list of songs available on a jukebox. Each table in the tables group comprises in particular an identification number of each list (MAS_ID), a description of the list (MAS_DESC) and the type of list (MAS_TYPE). The names of songs making up the list identified in the MASTER specific tables group is contained in the MASTER_CATALOGUE specific tables group.

The MODEM_STRING specific tables group shown in FIG. 3E contains text strings necessary for the initialization of jukebox modems. This array is related to the IB_OTHER_STRING tables group containing jukebox settings and particularly the modem setting.

The OPERATOR specific tables group belongs to the seventh set of arrays (1107, FIGS. 3A and 3F) and contains all information about all operators with a jukebox managed by the device according to the invention. An operator is a user who rents one or a plurality of jukeboxes. In particular, each table group contains a unique identifier (OPE_ID) for each operator and the name (OPE_NAME) of each operator. Each table also contains a default setting that each operator would like to install in the jukeboxes that he rents. The default setting is identified by the (COS_ID, REM_ID, CRE_ID, ISP_ID, SET_ID, MIX_ID) identifiers that relate each table to the different tables in setting table groups (IB_TUNE_COST, IB_REMOTE_CONTROL, IB_CREDIT, IB_ISP, IB_OTHER_SETING, IN_MIXAGE) defined above.

The ORDERING specific tables group, FIG. 3A, contains all songs ordered by an operator through a jukebox, or through direct communication with the server. Each table in this tables group corresponds to an ordered song (CTL_ID). As soon as the song has been sent to the jukebox, the table corresponding to the sent song is erased by the server 10.

The PACKAGE specific tables group belongs to the second set of arrays (1102, FIGS. 3B and 3D) and contains information about program groups installed on jukeboxes. The composition of these groups is contained in the PACKAGE_DEF specific tables group.

The PHONE specific tables group, FIG. 3A, contains all telephone numbers useful for management of jukeboxes. Each table in this tables group contains the telephone number (PHO_NUMBER), the identification of the person to whom the number belongs (PHO_OBJECT_SOURCE), the identifier of the array containing information about the holder (PHO_OBJECT_ID), the type of line corresponding to the number (PHO_TYPE) in other words whether the number is a fixed telephone number, or a fax number or a portable telephone number.

The PLAY_LOG specific tables group belongs to the eighth set of arrays (1108, FIGS. 3A and 3E) and is used to archive all distributions of songs to jukeboxes. The tables in this tables group are updated every time that a jukebox sends a log file to the server. Each table corresponds to the distribution of one song.

The PROGRAM specific tables group belongs to the second set of arrays (1102, FIGS. 3B and 3E) and contains all versions of all programs used. Each table in this tables group contains in particular the name (PGD_NAM), and the version (PGM_VERSION) of the program, but also the program itself (PGM_CODE_SOURCE). Each table corresponds to one version of a program. Programs designed to run on jukeboxes are described in the PROGRAM_DEF specific tables group.

The PROMOTION specific tables group belongs to the eleventh set of arrays (1111, FIG. 3B) and is used to describe promotions that could apply to a jukebox. For example, a promotion might be a cost reduction or a free play of one or a plurality of given songs. Songs affected by the promotion are listed in the PRO_PACKAGE_CATALOGUE specific tables group. The promotion may be broadened to include all songs by a given artist. In this case, the artist identifiers (ART_ID) concerned by the promotion are contained in the PRO_PACKAGE_ARTIST specific tables group. Similarly, a promotion may contain promotions on given songs or on all songs by an artist at the same time, and in this case a PRO_PACKAGE array will contain an argument used to relate the PRO_PACKAGE_ARTIST and PRO_PACKAGE_CATALOGUE tables to the PROMOTION tables. Similarly, a PRO_PRICING tables group also comprises an argument used to relate the PROMOTION specific tables group to the PRICING specific tables group containing a precise definition of the periods during which the promotion is valid.

The PUBLISHER specific tables group (not shown) belongs to the ninth set of arrays (1109, FIG. 3F) and contains all information about publishers.

The PUBLISHER_ROYALTY specific tables group belongs to the ninth set of arrays (1109, FIG. 3F) and contains all information about the payment of fees to publishers of distributed songs or songs copied on a jukebox.

The REPLACEMENT_PROGRAM specific tables group belongs to the ninth set of arrays (1102, FIGS. 3B and 3D) and is used to indicate that one program (PGD_NAME) is replaced by another program (REP_PGD_NAME) starting from a given date (REP_START-DT).

The SOFTWARE specific tables group belongs to the second set of arrays (1102, FIGS. 3B and 3D) and is used to make the link between a program and a jukebox on which the program is installed. Each table in this tables group is used to assign a program (PGD_NAME) to a jukebox defined by its number (JUK_ID). Each table is also used to archive the different program installations that were validated on a jukebox but that are no longer authorized. The current valid setting for a given jukebox (JUK_ID) is contained in the specific table with the most recent date (SOF_START_DT). Other tables are kept as archives.

The SONG specific tables group belongs to the fourth set of arrays (1104, FIGS. 2 and 3A) and is used to make the link between downloaded songs and a jukebox on which songs were downloaded. Each table in this tables group is used to assign a song (CLT_ID) to a jukebox defined by its number (JUK_ID). This tables group is used to obtain a song downloading history and determine the fees to be paid for each downloading. This tables group can also be used to archive different songs that were installed on a jukebox.

The SYSTEM_LOG specific tables group belongs to the eighth set of arrays (1108, FIGS. 3A and 3E) and contains all information transmitted by jukeboxes in log files, apart from information concerning distributions of songs contained in the PLAY_LOG specific tables group.

The WAREHOUSE specific tables group belongs to the seventh set of arrays (1107, FIG. 3A) and is used to assign one or a plurality of jukeboxes to an operator's company. One operator may have a plurality of companies. Therefore, it is easier for the management of jukeboxes rented by this operator, to assign each jukebox to a company.

FIGS. 5A to 5H show different windows in which the information in database arrays is displayed. The server comprises a presentation module forming a user interface, in order to more easily manipulate information contained in the sets of arrays in the database of the system according to the invention. This module is used to display information in the database in an easy to read form, but also to selectively collect this information such that a user who is not familiar with the architecture of the database can access some information, even on the server. Furthermore, this module can be used to modify, add or delete information in the database.

Essentially, this module displays a plurality of screens or windows each containing either information display areas, or information input areas, or selection areas or buttons, on a monitor. Selection areas are usually related to procedures that in particular initiate the collection and storage of information in the database or the validation of information input in input areas.

Figure 5A:
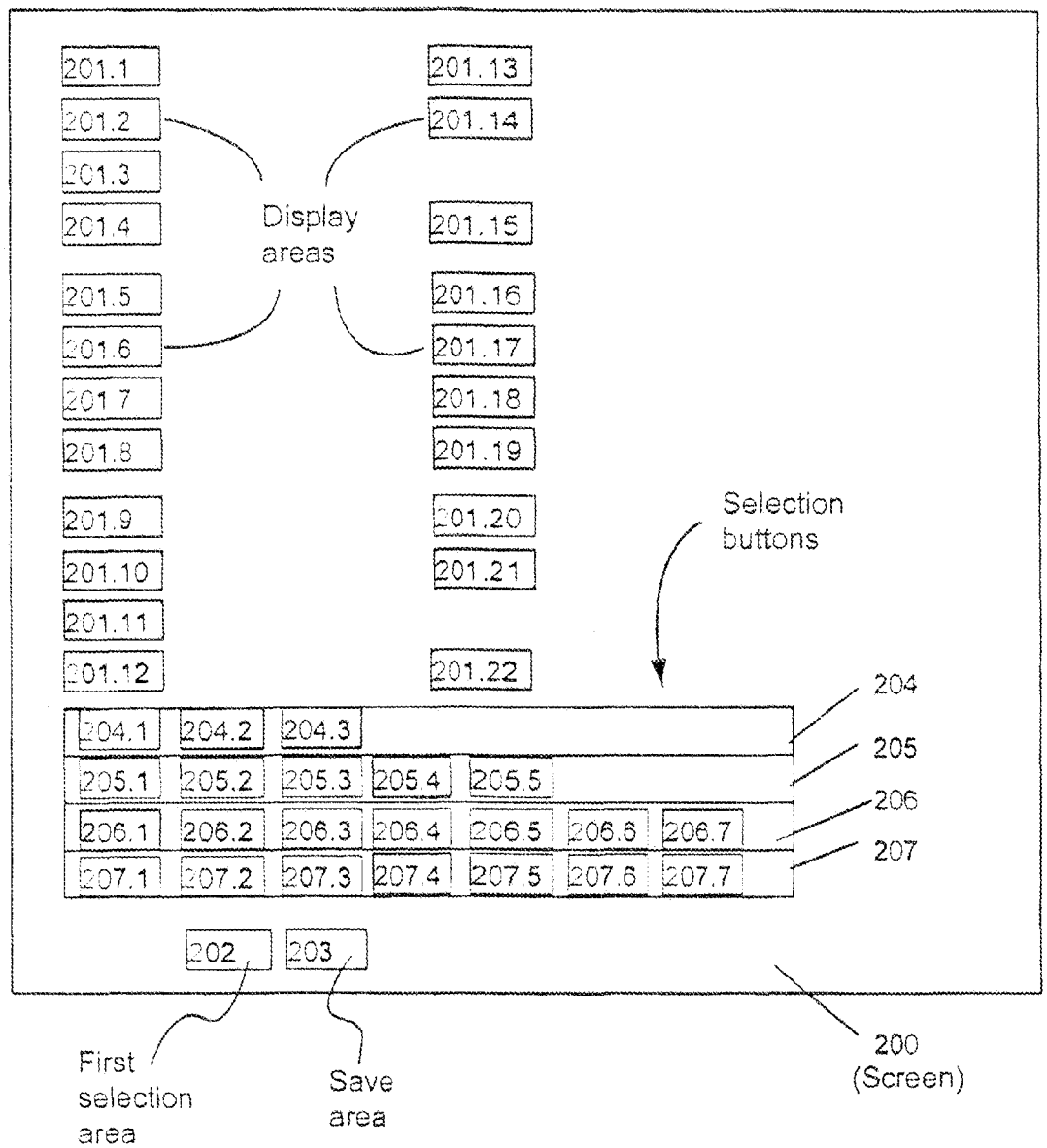
FIGS. 5A to 5H show different arrays used to display information in the database.
Figure 5B:
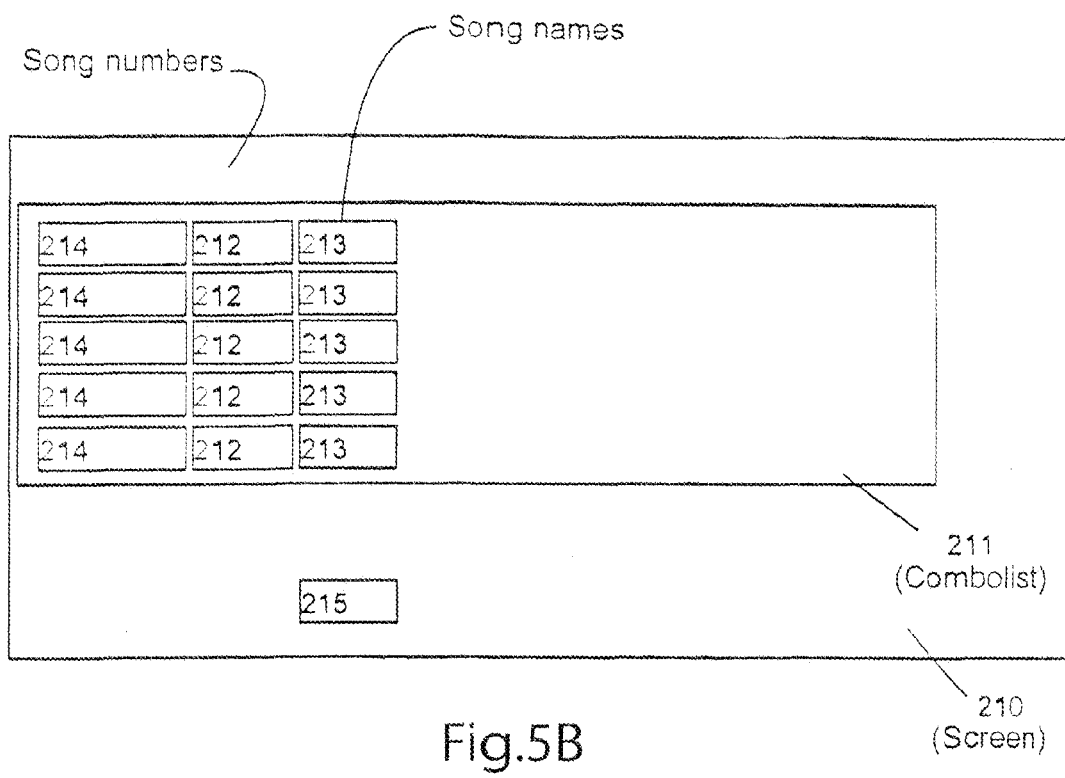
Figure 5C:
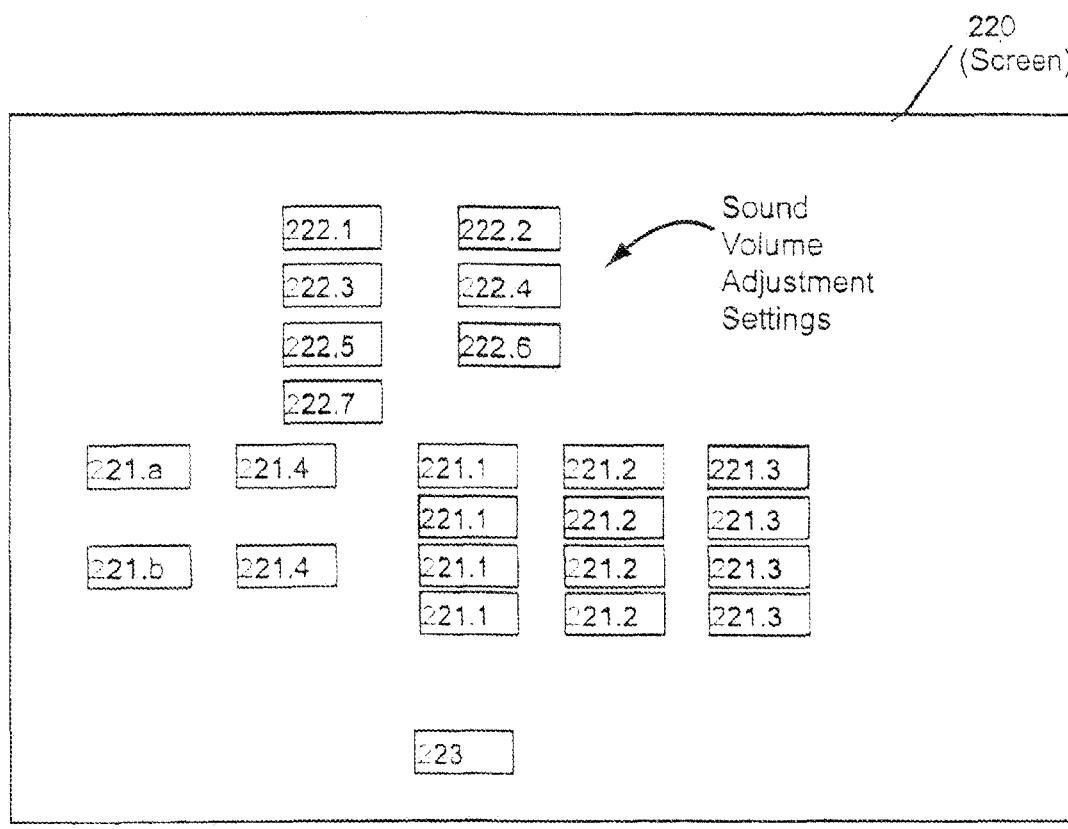
Figure 5D:
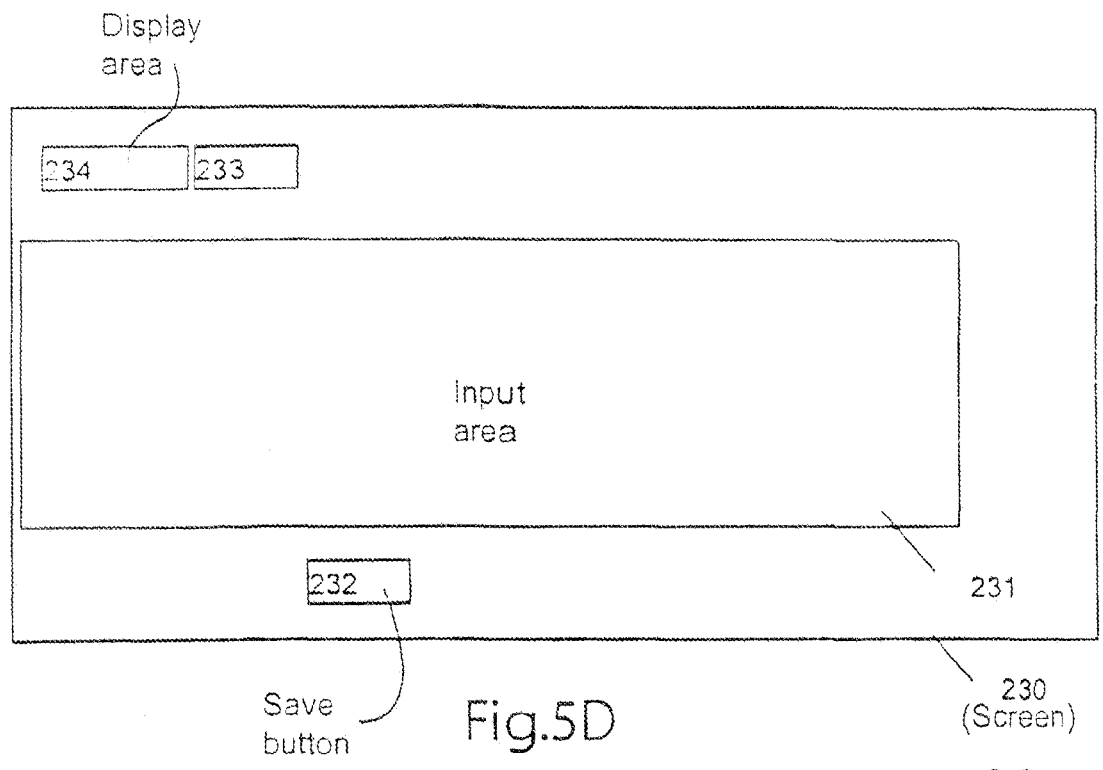
Figure 5E:
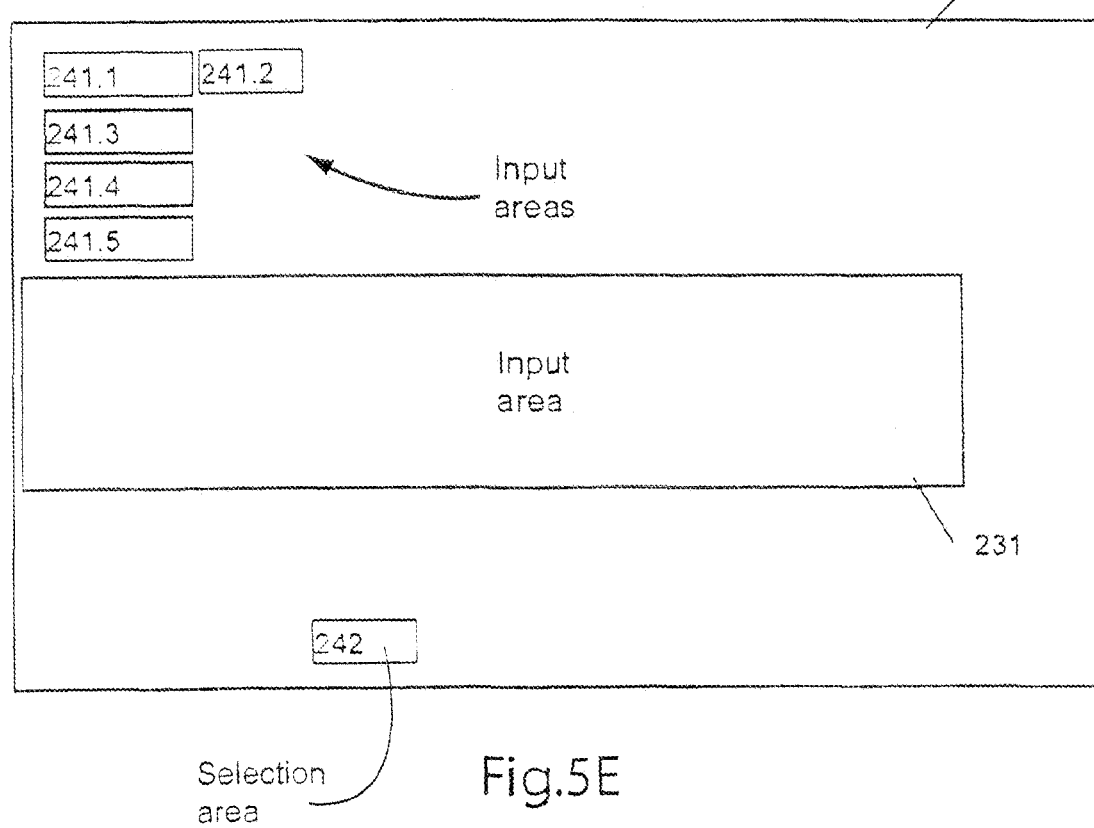
Figure 5F:
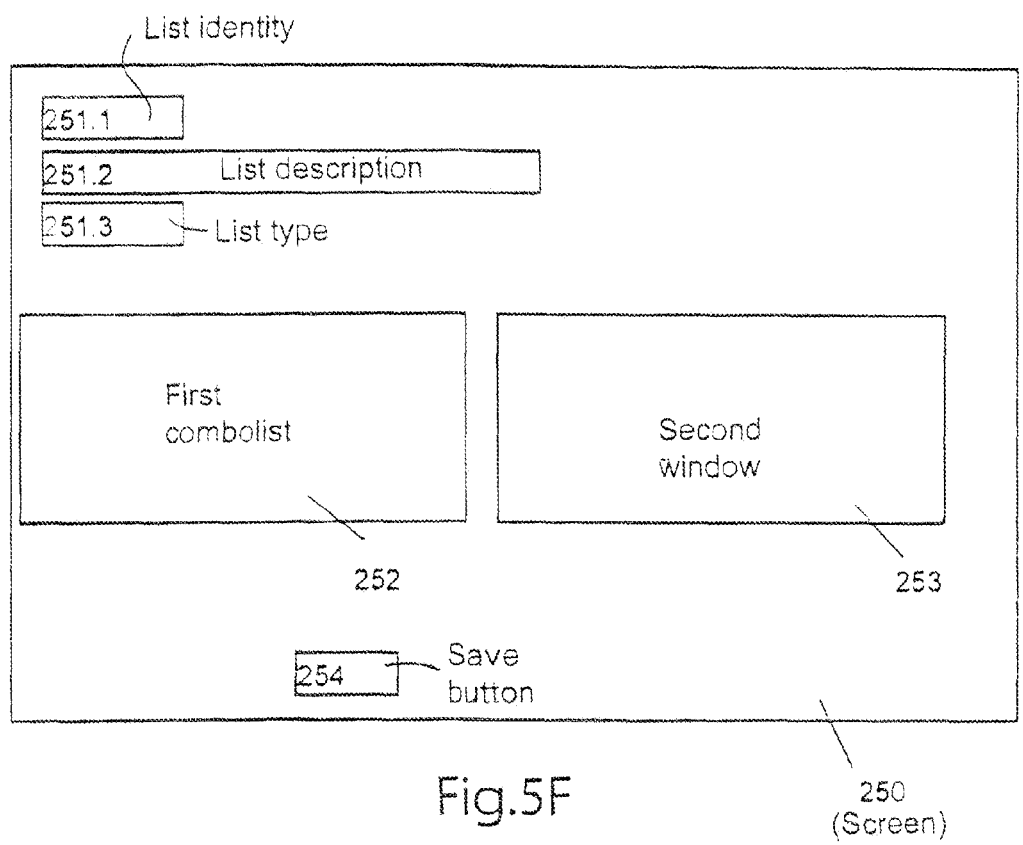
Figure 5G:
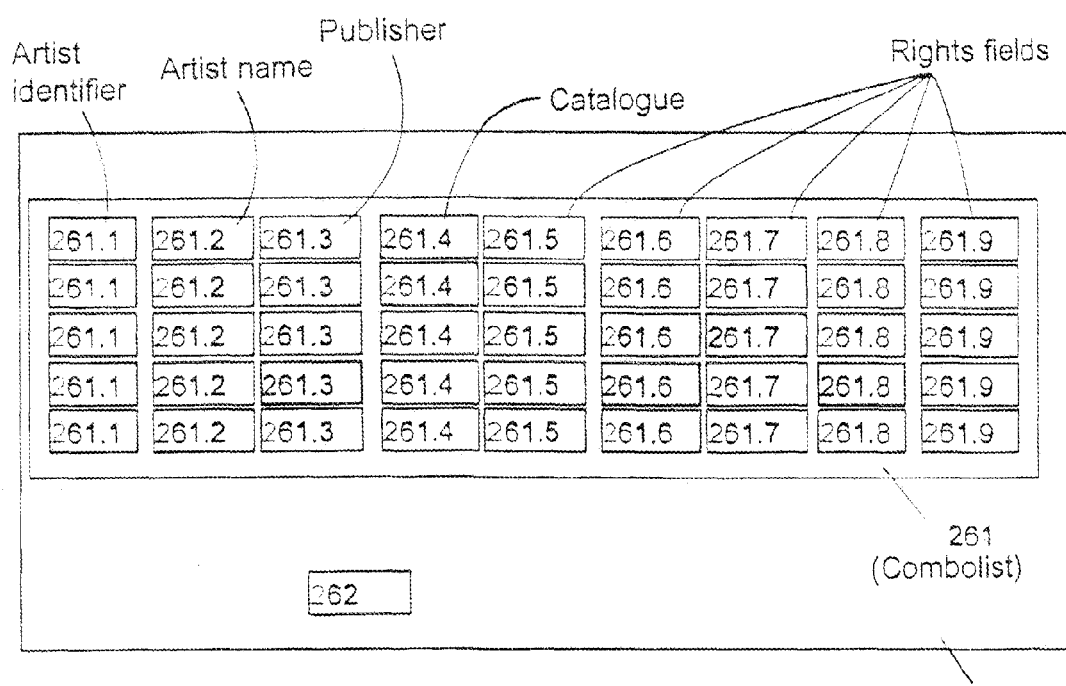
Figure 5H:
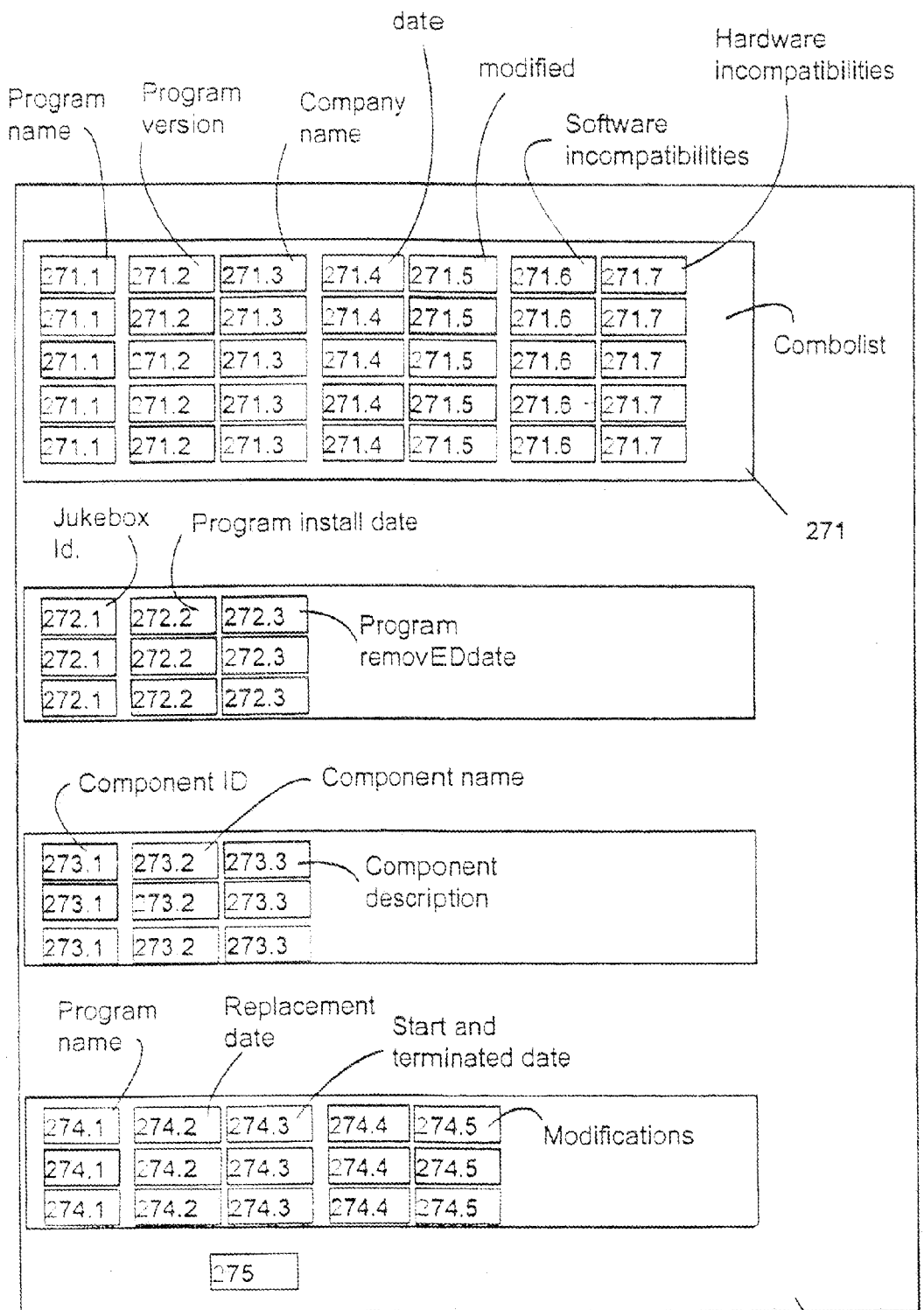

A first screen 200 shown in FIG. 5A is intended to display or manipulate all information about a jukebox. This screen 200 contains a plurality of areas 201.1 to 201.22 that may be display areas or input areas. Each of these areas 201.1 to 201.22 corresponds to an argument in the JUKE-BOX array, FIG. 3A. When a-user would like to refer to information about an existing jukebox, he simply inputs the identification number of the required jukebox in a first input area 201.1 and validates this input by selecting a first selection area 202. This selection triggers a search among all values of arguments in the JUKEBOX specific tables group, FIG. 3A in the database, to find the one with an identification number that corresponds to the input number. Once this information has been collected, it is displayed in the corresponding display areas 201.2 to 201.22. When the user would like to create a new jukebox, he simply inputs a number that has not yet been used in the first area 201.1 corresponding to the identification number, and then validates his choice by selecting a second save area 203. This save triggers the creation of a new table in the JUKEBOX specific tables group, FIG. 3A, and generation of a password necessary for operation of the new jukebox and that is displayed in the corresponding display area 201.2. Apart from the display areas 201.1, 201.2 corresponding to the jukebox number and the password, the other input areas 201.3 to 201.22 are blank. The first array 200 also comprises a plurality of series of selection buttons 204 to 207 each of which triggers the display of a new screen. These new screens will display information about the creation, update or operation of the jukebox identified by the number input in the corresponding area 201.1 on the first screen 200.

A first series 204 of buttons is used to setup a jukebox with previously defined default parameters. Selection of a first button 204.1 causes the I-button of the jukebox corresponding to the number input or displayed in the first area 201.1 to be initialized, thus this operation assigns a default value for each operating parameter of the jukebox. A second button 204.2 displays a screen (not shown) that assigns a predefined list of songs to the jukebox, and these songs will then be installed on the jukebox to create the list of songs available on the jukebox. A third button 204.3 displays a screen (not shown) that assigns a predefined list of programs to the jukebox, that will be used to operate the jukebox.

A second series 205 of buttons is used to display the description of components of the jukebox. A first button 205.1 causes the display of a screen (not shown) containing a plurality of fields used to display information about the operator. This information is collected in the OPERATOR tables group, FIG. 3A, for the identifier of the operator renting or owning the jukebox. A second button 205.2 displays a screen (not shown) comprising a plurality of fields used to display information about programs installed on the jukebox. This information is collected in the SOFTWARE tables group, FIG. 3B, and in the PROGRAM_DEF tables group, FIG. 3D. A third button 205.3 causes the display of a screen (not shown) comprising a plurality of fields used to display information about hardware components installed on the jukebox. This information is collected in the COMPONENT tables group, FIG. 3B and in the COMPONENT_DEF tables group, FIG. 3B. A fourth button 205.4 causes the display of a screen (not shown) comprising a plurality of fields used to display the list of songs now on order for the jukebox. This information is collected in the ORDERING tables group, FIG. 3A. A fifth button 205.5 causes the display of a second screen shown in FIG. 5B. The display of this screen is preceded by a collection of information in the SONG array, FIG. 3A and the CATALOGUE array, FIG. 3B, to display the list of songs available on the jukebox identified by its identifier, in a combolist 211 on the second screen 210. Songs are identified by their number 212 and their name 213. The numbers of all song are collected in the SONG specific tables group, and for each song on the jukebox, the server is provided with means of displaying the purchase date, the delivery date, the transfer time, the song deletion date and the song name, these elements being collected in the CATALOGUE specific tables. This second screen 210 is intended for viewing only, and does not include an input area.

A third series 206 of buttons displays a screen used to view jukebox operating parameters. Each button 206.1 to 206.7 actually causes the display of parameters identified in each table in the JUK_PASSWORD, JUK_TUNE_COST, JUK_REMOTE_CONTROL, JUK_MIXAGE, JUK_ISP, JUK_CREDIT, JUK_OTHER_SETTING table groups, FIGS. 3A and 3C, for which the argument identifying the jukebox corresponds to the identifier displayed in the first display area 201.1 on the first screen 200, FIG. 5A. Thus, selecting one of the buttons 206.1 to 206.7 initially triggers a collection of information in the JUK_AAA tables group corresponding to the button, to find the table for which the jukebox identifier number corresponds to the required number. Information is then collected in table IB_AAA in the tables group associated with table JUK_AAA to determine the value of parameters corresponding to the identifier of the parameter set found in the table in the JUK_AAA tables group. As a non-restrictive example, selecting a first selection button 206.1 in the third series will trigger collection of information in the JUK_MIXAGE and IB_MIXAGE arrays, both FIG. 3A, to display sound settings for the jukebox selected in the first screen, in a third screen 220. This third screen 220 is intended for viewing only, and does not have an input area. The various sound volume adjustment settings (maximum 221.4, volume 221.1, bass 221.2, treble 221.3) for the right and left channels for each area 221a, 221b are displayed in the display areas 221. Display areas are used to display volume settings for a microphone 222.1, an auxiliary source 222.2, and background music 222.3.

A fourth series 207 of selection buttons is used to display a screen to manage jukeboxes and particularly communications between the server and jukeboxes. A first button 207.1 causes the collection of information by the server in the INSTRUCTION, INSTRUCTION-DEF, and INS_XXX table groups, FIG. 3F, to display a fourth screen 230 containing the list of instructions to be sent to the jukebox selected in the first screen 200, and displayed in a first display area 234. Therefore, this fourth screen 230 comprises an area 231 in which previously defined instructions can be displayed, or in which these instructions can be modified or new instructions can be added. The fourth screen 230 comprises a save button 232 used to validate instructions input or modified in the input area 231 until the given send date. This validation also causes an update to the INSTRUCTION, INSTRUCTION_DEF, and INS_XXX table groups.

A second button 207.2, provokes the collection of information in the PLAY_LOG tables group in FIG. 3A, and then displays a screen, for example displaying the history of all songs played on a jukebox identified by the identifier number displayed in the first area 201.1 in the first screen 200. After the collection of information in the SYSTEM_LOG tables group in FIG. 3A, a third button 207.3 displays a screen, for example displaying the history of all actions executed on the jukebox identified by the identifier number displayed in the first area 201.1 in the first screen 200. For examples, these actions consist of subsequently inserting an amount of money in the jukebox coin slot A fourth button 207.4 provokes the collection of information in the COMMAND tables group, and then displays a screen for example displaying the history of all orders that have been executed on the jukebox identified by the identifier number displayed in the first area 201.1 of the first screen 200. A fifth button 207.5 provokes the collection of information in a JUK_CONNECTION tables group, and then displays a screen displaying all connections setup between the server and the jukebox identified by the identifier number displayed in the first area 201.1 of the first screen 200 when the jukebox makes the connection with the server. A sixth button 207.6 provokes the collection of information in the LOG_RECEPTION tables group, FIG. 3E, and then displays a screen displaying the history of all log files received by the server and sent by the jukebox identified by the identifier number displayed in the first area 201.1 of the first screen 200. A seventh button 207.7 provokes the collection of information in the EXECUTED_INSTRUCTION tables group, FIG. 3F, and then displays a screen displaying the history of all instructions executed on the jukebox identified by the identifier number displayed in the first area 201.1 of the first screen 200.

A fifth screen 240 is used to update the songs bank contained in the database. This screen 240 is used in particular to add albums or to modify data in the songs bank, particularly when distribution rights are obtained and/or when songs are processed to be downloaded on jukeboxes. Therefore, this fifth screen 240 comprises essentially the input areas 241.1 to 241.4 used to indicate all information about albums. Each input area 241 corresponds to an argument in the ALBUM array, FIG. 3A in the database. A first area 241.1 contains the album identifier. A second area 241.2 contains the album name. A third area 241.3 contains the name of the artist starring in the album. A fourth area 241.4 contains the name of the disk publisher. The fifth screen 240 also comprises a combolist 243 that displays the list of songs on the album identified by its identifier. Thus, validating the input by selection of a first selection area 242 makes the server update the ALBUM array, FIG. 3A, either to modify the corresponding arguments if the input consists of a modification to an existing album, or to add a table in the tables group when the input corresponds to adding a new album into the songs bank.

A sixth screen 250 is used to create lists of songs (master). These lists can then be used as a starting point to initialize the list of songs available on a jukebox. The sixth screen comprises a number of input areas used to identify the list 251.1, for example to briefly describe the list 251.2 and to define the list type 251.3, in other words whether it is a list still being produced or a final list. Each input area 251.1 to 251.3 actually corresponds to an argument in the MASTER array, FIG. 3B. The sixth screen 250 also comprises a first combolist 252 containing the list of songs in the songs bank and a second window 253 containing the list of songs already selected to form part of the current list. The sixth screen 250 also comprises a save button 254 used to validate the list produced. This selection either provokes the creation of a table in the MASTER specific tables group, FIG. 3B, and creation of a table in the MASTER_CATALOGUE specific tables group for each song in a new list, FIG. 3B in the case of a new list, or provokes the addition or deletion of a table in the MASTER_CATALOGUE specific tables group, FIG. 3B, for an update to an existing list.

A seventh array 260 displays all rows in the PUBLISHER array. This particular information collection is made by the server and is used to manage royalties associated with each publisher. In order to do this, the seventh screen 260 comprises a combolist 261 composed of a plurality of lines. Each line comprises a first field 261.1 representing the artist's identifier, a second field 261.2 representing the artist's name, in other words in this case the name of the publishing company, a third field 261.3 representing the name of the publishing company's administrator, a fourth field 261.4 identifying whether of not the publisher is in the catalogue, and a series of fields 261.5 to 261.9 used to define whether or not the publisher allows reproduction and distribution rights. Thus, a first field 261.5 indicates the date on which the written distribution authorization was granted. A second field 261.6 indicates the date on which the signature is expected for authorization. A third field 261.7 indicates the date starting from which the contract for the agreement about the distribution of fields has been waiting for comments. A fourth field 261.8 indicates the date on which a verbal agreement was obtained. A fifth field 261.9 indicates the date from which the distribution agreement is no longer valid.

A seventh screen 270 is used to make the inventory of programs used by jukeboxes. The seventh screen 270 comprises a first combolist 271 used to display the list of program versions and if there are any incompatibilities with other programs or hardware components. This information is displayed through information collection in the PROGRAM and PROGRAM_INCOMPACT arrays, FIG. 3D, in the database. In order to do this, a first field 271.1 contains the program name. A second field 271.2 contains the program version, a third field 271.3 contains the name of the company that distributes the program. A fourth field 271.4 indicates the date on which the program will be available. A fifth field 271.5 indicates the person who modified the program (if any). A sixth field 271.6 indicates if there are any incompatibilities with other programs. A seventh field 271.7 indicates if there are any incompatibilities with one or more hardware components.

A second combolist 272 displays the list-of jukebox numbers on which a program selected in the first window 271 is installed, and the installation date and possibly the deinstallation date. This information is displayed after collecting information in the SOFTWARE specific tables group, FIG. 3B, in the database. The second window thus comprises a first field 272.1 containing the identifier numbers of jukeboxes on which the program is installed. A second field 272.2 contains the date on which the program was installed on the jukebox. A third field 272.3 contains the date on which the program was deleted from the jukebox.

A third combolist 273 is used to verify if the program selected in the first window 271 is associated with a hardware component. This information is displayed after collecting information in the FIRMWARE and COMPONENT_ DEF arrays, FIG. 3B, in the database. Thus, a first field 273.1 contains the component identifier. A second field 273.2 contains the description or name of the component. A third field 273.3 contains the component installation date.

A fourth combolist 274 is used to verify if the program selected in the first window 271 has been replaced, and possibly when the program was or will be replaced. This information is displayed after collecting information from the REMPLACEMENT_PROGRAMM specific tables group, FIG. 3D, in the database. Thus, a first field 274.1 contains the program name. A second field 274.2 contains the program version. A third field 274.3 contains the date on which the program replacement was started. A fourth field 274.4 indicates the date on which program replacement was terminated. A fifth field 274.5 may, for example, contain a brief description of modifications made to the program at the time of the replacement.

Other screens may be created on a same model as the screens described above to display other information contained in the database. The displayed information may consist of a simple display of information contained in an array in the database, like for example for the first screen 200, or it may also be the result of a selective information collection, in other words the information search is made with particular criteria, for example as for the seventh screen 260. Similarly, some screens do not necessarily include an input area, in other words these screens are used solely to view information, for example the third screen 220.

It can be seen that the device according to the invention makes it easy to remotely control a plurality of jukeboxes from a central location through a telecommunications network, for example a telephone network.

Obviously, persons with experience in the subject will realize that this invention can be embodied in many other specific forms without going outside the scope of the invention as claimed. Consequently, these embodiments must be considered as an illustration, and can be modified within the limits defined by the field of the attached claims, and the invention must not be restricted to the details given above.

What is claimed is:

1. A method of operating a server in a digital audiovisual distribution system, the digital audiovisual distribution system comprising a plurality of digital jukebox devices, the digital jukebox devices being connectable to the server via respective network connections, the method comprising:
   controlling a communication circuit of the server to receive management data related to one or more components of the digital jukebox devices, each said component being one of a hardware, software, and firmware component of a respective digital jukebox device, the management data being generatable in connection with the respective digital jukebox devices;
   processing, using at least one processor of the server, the received management data, the processing including identifying which digital jukebox device(s) the received management data corresponds to, and locating update instructions for updating the identified digital jukebox device(s) in cooperation with the module;
   controlling the communication circuit to transmit the located update instructions to the identified digital jukebox device(s) through the digital audiovisual distribution system via associated network connection(s) in response to the processing, in order to cause a corresponding update at the identified digital jukebox device(s); and
   maintaining a data store configured to store information useful in managing the digital jukebox devices.

2. The method of claim 1, wherein the digital jukebox devices each include at least one processor configured to cause the respective digital jukebox device to generate the management data at a predetermined date and/or time.

3. The method of claim 1, wherein the digital jukebox devices each include at least one processor configured to process update instructions transmitted thereto and cause updates to be installed.

4. The method of claim 3, wherein updates are caused to be installed at a predetermined date and/or time.

5. The method of claim 1, wherein the data store includes a database comprising a plurality of data structures including information relating to said management data.

6. The method of claim 5, wherein at least a first data structure stores an indication of software that is installable on the digital jukebox devices.

7. The method of claim 6, wherein the indication of the software that is installable on the digital jukebox devices includes a name and a version number of the software.

8. The method of claim 5, wherein at least a second data structure stores an indication of software that is already installed on the digital jukebox devices.

9. The method of claim 5, wherein at least a third data structure stores an indication of hardware that is installable on the digital jukebox devices.

10. The method of claim 5, wherein at least a fourth data structure stores an indication of hardware that is already installed on the digital jukebox devices.

11. The method of claim 5, wherein at least a fifth data structure stores a description of incompatibilities as between different hardware and software components.

12. The method of claim 5, wherein at least a sixth data structure stores a listing of possible values for different sets of operating parameters and setting for all digital jukebox devices connected to the digital audiovisual distribution system, the possible values each being uniquely identifiable.

13. The method of claim 5, wherein at least a seventh data structure stores passwords, prices of songs, remote control settings, and/or a number of free songs.

14. The method of claim 5, wherein at least an eighth data structure stores a listing of songs available to each said digital jukebox device in the digital audiovisual distribution system.

15. The method of claim 5, wherein at least a ninth data structure stores a description of all songs, artists, and albums available for playback on the digital jukebox devices.

16. The method of claim 5, wherein at least a tenth data structure stores information regarding one or more operator-specified filters optionally individually assignable to the digital jukebox devices on a device-by-device basis, the filters preventing a download of at least one song.

17. The method of claim 5, wherein at least an eleventh data structure stores a history of usage of the digital jukebox devices.

18. The method of claim 5, wherein at least a twelfth data structure stores operator information for each said digital jukebox device.

19. The method of claim 5, wherein at least a thirteenth data structure stores an order in which update instructions are to be processed by the digital jukebox devices.

20. The method of claim 5, wherein at least a fourteenth data structure stores promotion information, the promotion information including a list of songs subject to a promotion, as well as promotion start and end dates, and price modifications for the songs in the list subject to the promotion.

* * * * *